United States Patent
Ju et al.

(10) Patent No.: US 9,954,244 B2
(45) Date of Patent: *Apr. 24, 2018

(54) APPARATUS FOR RAPIDLY STACKING FUEL CELL STACK

(71) Applicant: Hyundai Motor Company, Seoul (KR)

(72) Inventors: HoKyun Ju, Gyeonggi-do (KR); Yoon Jang, Incheon (KR)

(73) Assignee: Hyundai Motor Company, Seoul (KR)

( * ) Notice: Subject to any disclaimer, the term of this patent is extended or adjusted under 35 U.S.C. 154(b) by 201 days.

This patent is subject to a terminal disclaimer.

(21) Appl. No.: 14/852,580

(22) Filed: Sep. 13, 2015

(65) Prior Publication Data
US 2016/0365599 A1    Dec. 15, 2016

(30) Foreign Application Priority Data
Jun. 9, 2015    (KR) .................. 10-2015-0081509

(51) Int. Cl.
*H01M 10/14*    (2006.01)
*H01M 8/248*    (2016.01)

(52) U.S. Cl.
CPC ........ *H01M 8/248* (2013.01); *H01M 2250/20* (2013.01); *Y02T 90/32* (2013.01)

(58) Field of Classification Search
CPC ...... H01M 8/248; H01M 8/247; H01M 8/249; H01M 2250/20; Y02T 90/32
See application file for complete search history.

(56) References Cited

U.S. PATENT DOCUMENTS

| 4,132,400 | A | 1/1979 | Naramore |
| 7,005,209 | B1 * | 2/2006 | Gaines ................ H01M 8/0258 |
| | | | 429/434 |
| 2010/0031498 | A1 * | 2/2010 | Rober ................... H01M 8/247 |
| | | | 29/623.1 |
| 2016/0365598 | A1 * | 12/2016 | Ju ........................ H01M 8/2404 |

FOREIGN PATENT DOCUMENTS

| JP | 2013-219028 A | 10/2013 |
| KR | 10-2009-0062411 A | 6/2009 |
| KR | 10-2015-0035271 A | 4/2015 |

* cited by examiner

*Primary Examiner* — Raymond Alejandro
(74) *Attorney, Agent, or Firm* — Mintz Levin Cohn Ferris Glovsky and Popeo, P.C.; Peter F. Corless

(57) ABSTRACT

An apparatus is provided to stack a fuel cell stack by pressurizing a separating plate component including a membrane-electrode assembly (MEA) sheet component, in which gas diffusion layers are bonded to both surfaces of an MEA, respectively. The apparatus include a component aligning unit connected to a completion end of a component transfer route of a conveyor to align the separating plate component and the MEA sheet component transferred by the conveyor to predetermined positions. A component stacking unit is installed at the component aligning unit side, and is configured to grip the separating plate component and the MEA sheet component and stack the components on a stack guide. A component pressurizing unit is installed at an upper side of a transfer route, through which the stack guide is transferred, and is configured to pressurize the separating plate component and the MEA sheet component stacked on the stack guide.

10 Claims, 25 Drawing Sheets

310

350

350

450

APPARATUS FOR RAPIDLY STACKING FUEL CELL STACK

CROSS-REFERENCE TO RELATED APPLICATION

This application claims priority to and the benefit of Korean Patent Application No. 10-2015-0081509 filed in the Korean Intellectual Property Office on Jun. 9, 2015, the entire contents of which are incorporated herein by reference.

BACKGROUND (a) Field of the Invention

The present invention relates to an automatic fuel cell stack assembling system, and more particularly, to an apparatus for rapidly stacking a fuel cell stack, which stacks fuel cell components at a high speed.

(b) Description of the Related Art

As generally known in the field, a fuel cell stack is a type of power generating device that generates electrical energy through an electrochemical reaction between hydrogen and oxygen by fuel cells, and is applied to, for example, a fuel cell vehicle. The fuel cell stack is formed by an electricity generating assembly, in which several hundred fuel cells (unit cells) are continuously arranged. The fuel cell has a configuration in which separate plates are disposed at both sides of a membrane electrode assembly (MEA). The fuel cells may be fastened together by an end plate and a fastening device in a pressurized state.

The aforementioned fuel cell stack may be manufactured by a process of stacking fuel cells one by one, pressurizing the stacked fuel cells with a force while the fuel cells are disposed between upper and lower end plates, and fastening the end plate using the fastening device. In the related art, a fuel cell stack is manufactured by manually and collectively stacking fuel cells using a predetermined guide mechanism, or dividing and stacking the fuel cells in a unit of a small module and manually stacking the fuel cells in the unit of the small module. Therefore, according to the related art, a general cycle time based on the stacking, pressurizing, and fastening of the fuel cells may be disadvantageous, and reliability of the fuel cells may deteriorate.

In addition, to manufacture a fuel cell stack, supply and examination of respective components configuring the fuel cells, a stack method satisfying handling and securing a stack of the components, and air-tightness (e.g., an air seal) maintenance and a stack fastening process through pressurizing the fuel cells is not required to be performed. However, in the related art, the aforementioned processes are manually performed, thus causing productivity to deteriorate due to an increase in operation hours for assembling the fuel cell stack and quality of the fuel cell stack may deteriorate since a stack degree of the fuel cells cannot be guaranteed.

The above information disclosed in this section is merely for enhancement of understanding of the background of the invention and therefore it may contain information that does not form the prior art that is already known in this country to a person of ordinary skill in the art.

SUMMARY

The present invention provides an apparatus for rapidly stacking a fuel cell stack, which is capable of automatically stacking and pressurizing fuel cell components and assembling the fuel cell stack.

An exemplary embodiment of the present invention provides an apparatus for rapidly stacking a fuel cell stack, which assembles a fuel cell stack by stacking and pressurizing a separating plate component, in which a negative electrode metal separating plate and a positive electrode metal separating plate are bonded, and a membrane-electrode assembly (MEA) sheet component, in which gas diffusion layers are bonded to both surfaces of an MEA, respectively. In particular, the apparatus may include a component aligning unit installed to be connected to a completion end of a component transfer route of a conveyor to align the separating plate component and the MEA sheet component transferred by the conveyor to predetermined positions; a component stacking unit installed at the component aligning unit side, and configured to grip the separating plate component and the MEA sheet component and stack the components on a stack guide; and a component pressurizing unit installed at an upper side of a transfer route, through which the stack guide is transferred, and configured to pressurize the separating plate component and the MEA sheet component stacked on the stack guide.

The component stacking unit may include a pair of stack grippers disposed at an upper side of a beginning end of a transfer route of the stack guide, installed to reciprocate in a transfer direction of the separating plate component and the MEA sheet component, installed to reciprocate in a vertical direction, and configured to vacuum-adsorb the separating plate component and the MEA sheet component.

Particularly, the stack gripper may be configured to vacuum-adsorb any one component between the separating plate component and the MEA sheet component disposed at a completion end side of the conveyor, and load the vacuum-adsorbed component onto the component aligning unit. The stack gripper may further be configured to vacuum-adsorb the other component disposed in the component aligning unit and load the vacuum-adsorbed component onto the stack guide. The component aligning unit may include: a base plate configured to support the separating plate component and the MEA sheet component; and touch members installed on the base plate, and configured to touch edge portions of the separating plate component and the MEA sheet component.

The base plate may include a plurality of air exhaust outlets through which air may be discharged and may raise the separating plate component and the MEA sheet component with air pressure. The touch members may include: a pair of first touch members fixedly installed at a rear external side of the base plate, fitted to a rear edge portion of the base plate, and configured to touch rear edge portions of the separating plate component and the MEA sheet component; a pair of second touch members installed to be movable in front and rear directions at a front external side of the base plate, fitted to a front edge portion of the base plate, and configured to touch front edge portions of the separating plate component and the MEA sheet component; and a pair of third touch members passing through both sides of the base plate, installed to be movable in a direction of the side, and configured to touch both side edge portions of the separating plate component and the MEA sheet component.

The second touch members may be installed to reciprocate in the front and rear directions by a first touch cylinder fixed to a lower surface of the base plate. The third touch members may be installed to reciprocate in a side direction by a second touch cylinder fixed to the lower surface of the base plate. The component pressurizing unit may include a press member installed to reciprocate in the vertical direction by a press cylinder, and configured to rotate by a motor.

A pair of fixing rods that fix a stack body, in which the separating plate component and the MEA sheet component are stacked separately from the stack guide, may be installed in the press member.

The apparatus may further include an air-tightness examining unit connected to the component pressurizing unit and configured to supply a fluid to a stack body, in which the separating plate component and the MEA sheet component are stacked by the component pressurizing unit, and may be configured to detect air-tightness of the stack body. In addition, the apparatus may include a stack examining unit installed at the component stacking unit side, and configured to monitor (e.g., examine) the separating plate component and the MEA sheet component stacked on the stack guide.

Another exemplary embodiment of the present invention provides an apparatus for rapidly stacking a fuel cell stack, which assembles a fuel cell stack by stacking and pressurizing a separating plate component, in which a negative electrode metal separating plate and a positive electrode metal separating plate are bonded, and including a membrane-electrode assembly (MEA) sheet component, in which gas diffusion layers are bonded to both surfaces of an MEA, respectively. The apparatus may include a component stacking unit installed in a frame, and configured to grip the separating plate component and the MEA sheet component transferred by a conveyor and stack the component on the stack guide.

In addition, the apparatus may include a component pressurizing unit installed at an upper side of a transfer route, through which the stack guide may be transferred, and configured to pressurize the separating plate component and the MEA sheet component stacked on the stack guide; an end plate loading unit installed at an external side of a transfer route of the stack guide between the component stacking unit and the component pressurizing unit, and configured to grip each of upper and lower end plates and load the gripped end plate onto the stack guide; and a transferring unit configured to transfer the stack guide, on which the separating plate component and the MEA sheet component are stacked by the component stacking unit from a beginning end of the transfer route of the stack guide to the component pressurizing unit, and transfer a stack body, in which the separating plate component and the MEA sheet component are stacked by the component pressurizing unit, from the component pressurizing unit to a completion end of the transfer route of the stack guide, separately from the stack guide.

The apparatus may further include a stack discharging unit installed to be movable to the completion end of the transfer route of the stack guide from the component pressurizing unit, and configured to discharge the stack body to an external side of the transfer route of the stack guide. The transferring unit may include: a first transfer rail configured to connect a beginning end and a completion end of the transfer route of the stack guide in a direction crossing a component transfer route of the conveyor; a second transfer rail connected with the first transfer rail while crossing the first transfer rail in a direction distant from the end plate loading unit between the component stacking unit and the component pressurizing unit; and a pair of first transfer stages that correspond to the component stacking unit and the component pressurizing unit, respectively, and may be installed to be movable along the first and second transfer rails while supporting the stack guide between the component stacking unit and the component pressurizing unit.

The component pressurizing unit may separate the stack body from the stack guide and may be configured to load the stack body onto the stack discharging unit. The end plate loading unit may be configured to load a lower end plate onto the stack guide in an unloaded state, from which the stack body is separated, on the first transfer rail between the component stacking unit and the component pressurizing unit, and load an upper end plate onto the stack guide on which the separating plate component and the MEA sheet component are stacked by the component stacking unit.

The second transfer rail may be configured to evade the stack guide, onto which the lower end plate may be loaded, from the first transfer rail via the first transfer stage. The stack discharging unit may include: a second transfer stage installed to be movable along a section from the component pressurizing unit to the completion end of the first transfer rail between a beginning end and a completion end of the first transfer rail; and a tilting discharging unit installed in the second transfer stage, and configured to tilt and discharge the stack body to an external side of the first transfer rail. In particular, the tilting discharging unit may include: a tilt bracket configured to support the stack body, and installed to be rotatable in the second transfer stage; and a tilt operating cylinder installed to be connected to the tilt bracket, and configured to operate forward and backward in a vertical direction.

Still another exemplary embodiment of the present invention provides an apparatus for rapidly stacking a fuel cell stack, which assembles a fuel cell stack by stacking and pressurizing a separating plate component, in which a negative electrode metal separating plate and a positive electrode metal separating plate may be bonded and include a membrane-electrode assembly (MEA) sheet component in which gas diffusion layers may be bonded to both surfaces of an MEA, respectively In particular, the apparatus may include a component aligning unit connected to a completion end of a component transfer route of a conveyor to align the separating plate component and the MEA sheet component transferred by the conveyor to predetermined positions; a component stacking unit installed at an upper side of the component aligning unit, and configured to grip the separating plate component and the MEA sheet component and stack the components on a stack guide; a component pressurizing unit installed at an upper side of a transfer route, through which the stack guide may be transferred, and configured to pressurize the separating plate component and the MEA sheet component stacked on the stack guide; an end plate loading unit installed at an external side of a transfer route of the stack guide between the component stacking unit and the component pressurizing unit, and configured to grip each of upper and lower end plates and load the gripped end plate onto the stack guide; and a transferring unit configured to transfer the stack guide on which the separating plate component and the MEA sheet component are stacked by the component stacking unit from a beginning end of the transfer route of the stack guide to the component pressurizing unit, and configured to transfer a stack body, in which the separating plate component and the MEA sheet component are stacked by the component pressurizing unit, from the component pressurizing unit to a finish end of the transfer route of the stack guide, separately from the stack guide.

The apparatus may further include a stack discharging unit installed to be movable to the completion end of the transfer route of the stack guide from the component pressurizing unit, and configured to discharge the stack body to an external side of the transfer route of the stack guide.

BRIEF DESCRIPTION OF THE DRAWINGS

The objects, features and advantages of the present invention will be more apparent from the following detailed description in conjunction with the accompanying drawings, in which.

DESCRIPTION OF SYMBOLS

Figure 1:
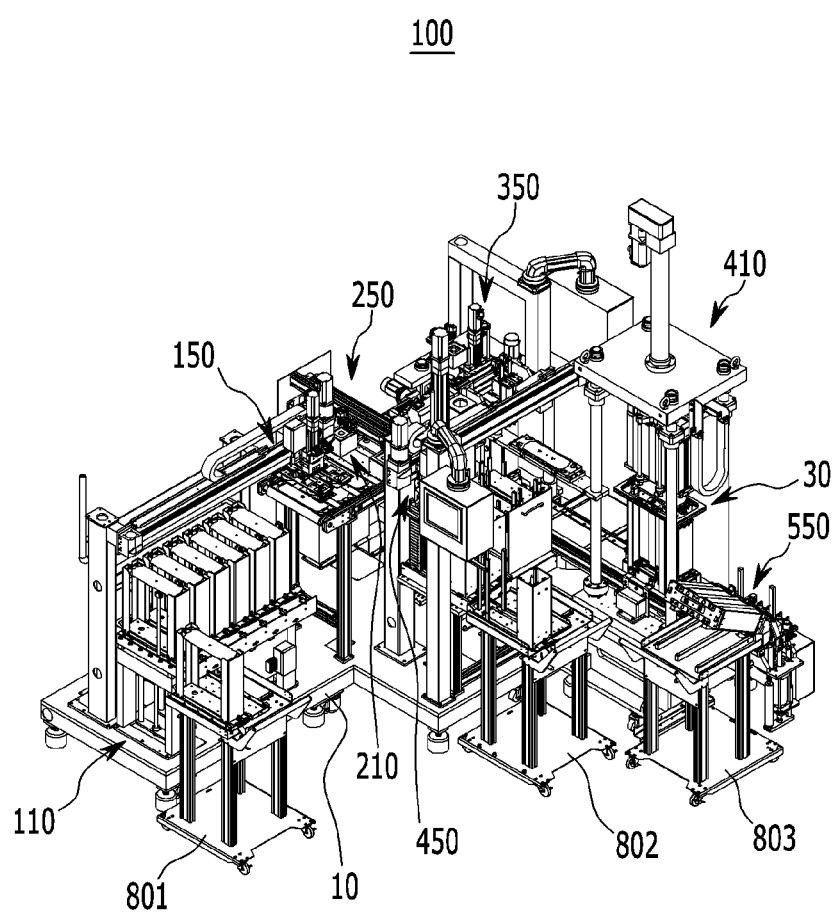
FIGS. 1 to 4 are perspective views illustrating an apparatus for rapidly stacking a fuel cell stack according to an exemplary embodiment of the present invention.
Figure 2:
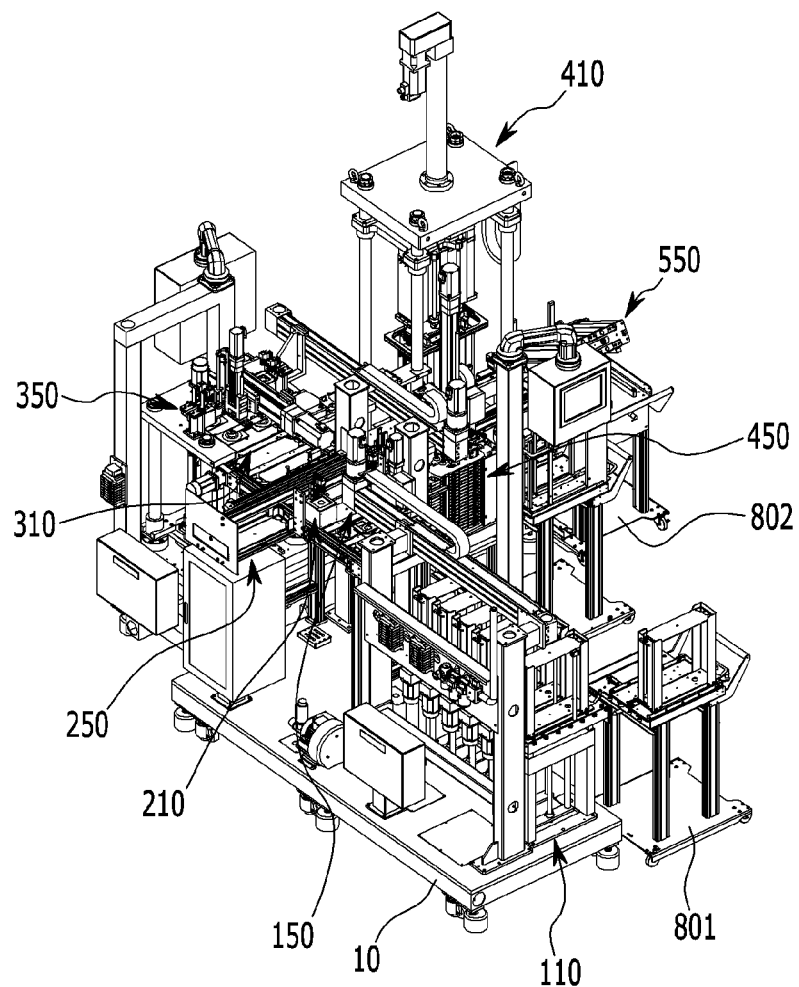
Figure 3:
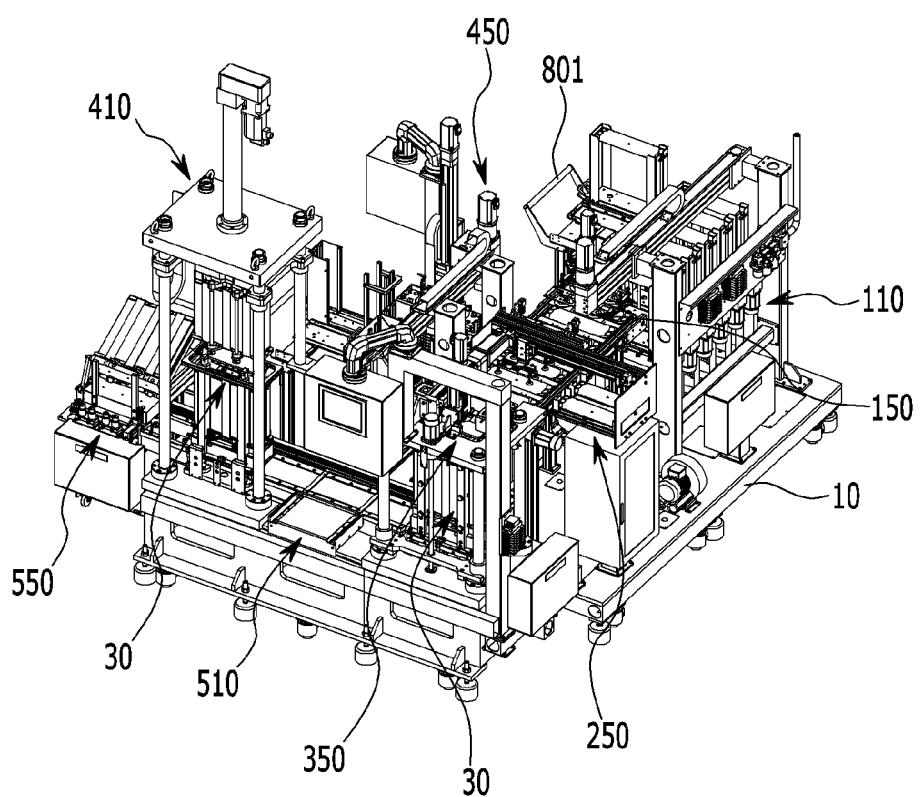
Figure 4:
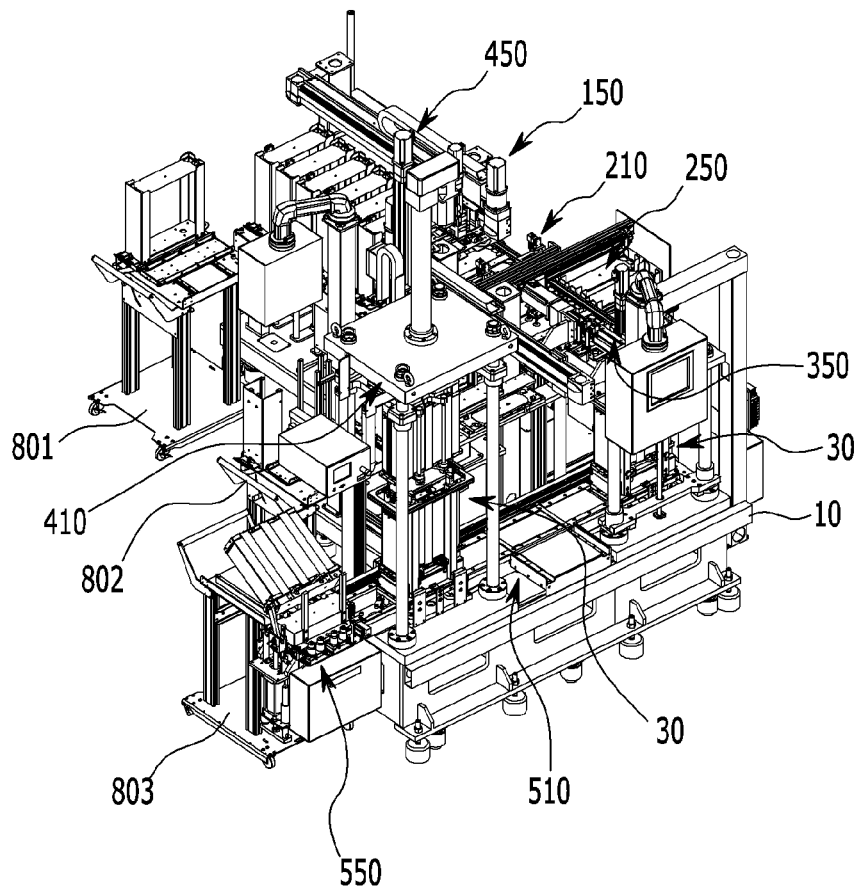

1: Fuel cell stack
3: Fuel cell component
4: Separating plate component
4a, 4b: Negative electrode/positive electrode metal separating plate
4c: Manifold aperture
5: MEA sheet component
5a: Membrane-electrode assembly
5b: Gas diffusion layer
6: Stack body
7: End plate
8: Insulating plate
9: Fastening bar
10: Frame
30: Stack guide
110: Lift unit
111: First magazine
112: Second magazine
113: Lift plate
115: Support frame
117: Lift motor
119: Lead screw
121: Lifting plate
123: Guide bar
124: Nut
125: Lift driving device
130: Conveyor
131: Component transfer route
150: Component pick-up unit
151: First gripper bracket
152: Second gripper bracket
153: First component gripper
155: Second component gripper
157: Connection bracket
161: Paper gripper
169: Paper
171: Paper separating device
175: Paper collecting container
190: First driving device
191: First guide rail
193: First slider
195: First drive motor
197: First driving cylinder
210: Component examining unit
211: Location sensor
213: First location adjusting rail
215: Moving block
217: Second location adjusting rail
250: Defective component extracting unit
251: Defective component extracting gripper
253: Fixing bracket
255: Connecting member
271: Tray
290: Second driving device
291: Second guide rail
293: Second slider
295: Second drive motor
297: Second driving cylinder
310: Component aligning unit
311: Base plate
312: Air exhaust outlet
319: Penetration aperture
321: First touch member
322: Second touch member
323: Third touch member 325: Fixed bar
331: First touch cylinder
332: Second touch cylinder
350: Component stacking unit
351: Stack gripper
353: Mounting bracket
355: Connecting plate
370: Stack examining unit
371: Vision sensor
390: Third driving device
391: Third guide rail
393: Third slider
395: Third drive motor
397: Third driving cylinder
410: Component pressurizing unit
411: Press member
413: Press cylinder
415: Fixing rod
417: Pressing motor
430: Air-tightness examining unit
450: End plate loading unit
451: End plate gripper
490: Fourth driving device
491: Fourth guide rail
493: Fourth slider
495: Fourth drive motor
497: Fourth driving cylinder
510: Transferring unit
511: First transferring rail
513: Second transferring rail
515: First transferring stage
550: Stack discharging unit
551: Second transferring stage
553: Tilting discharging unit
561: Tilt bracket
563: Holding plate
565: Support
571: Tilt operating cylinder
573: Operating rod
575: Connection rod
801: Trolley
802: Second trolley
803: Third trolley
900: Controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

Figure 5:
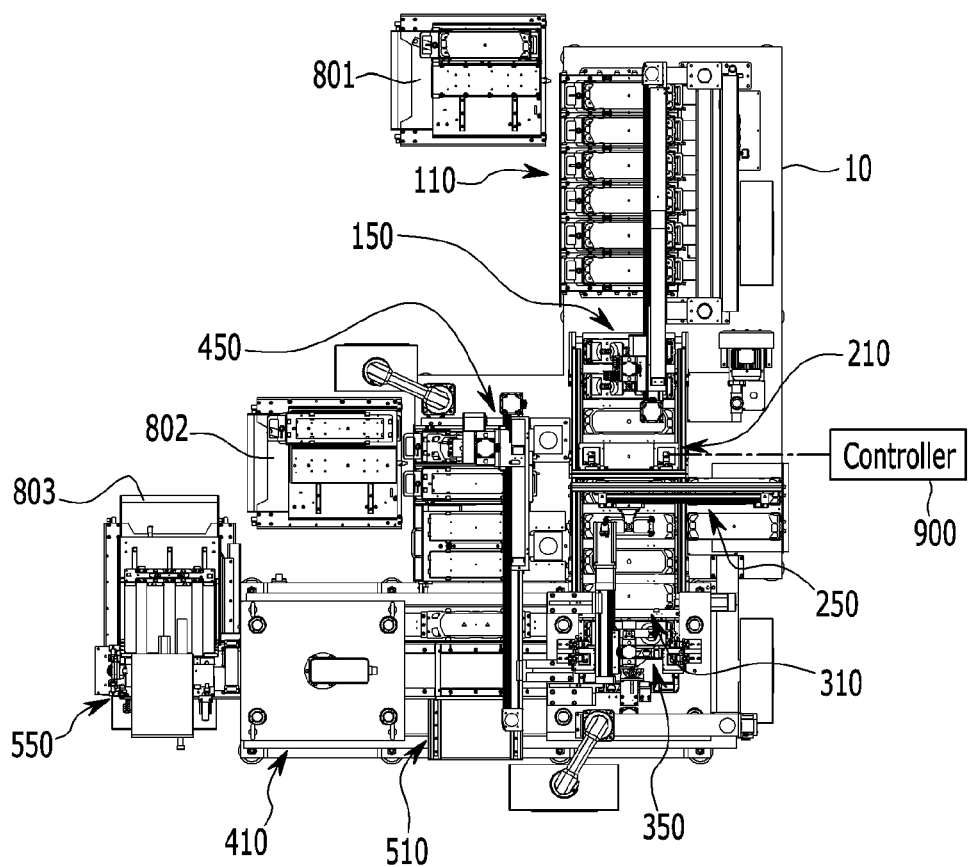
FIGS. 5 to 7 are a top plan view, a rear view, and a side view of the apparatus for rapidly stacking a fuel cell stack according to the exemplary embodiment of the present invention, respectively.
Figure 6:
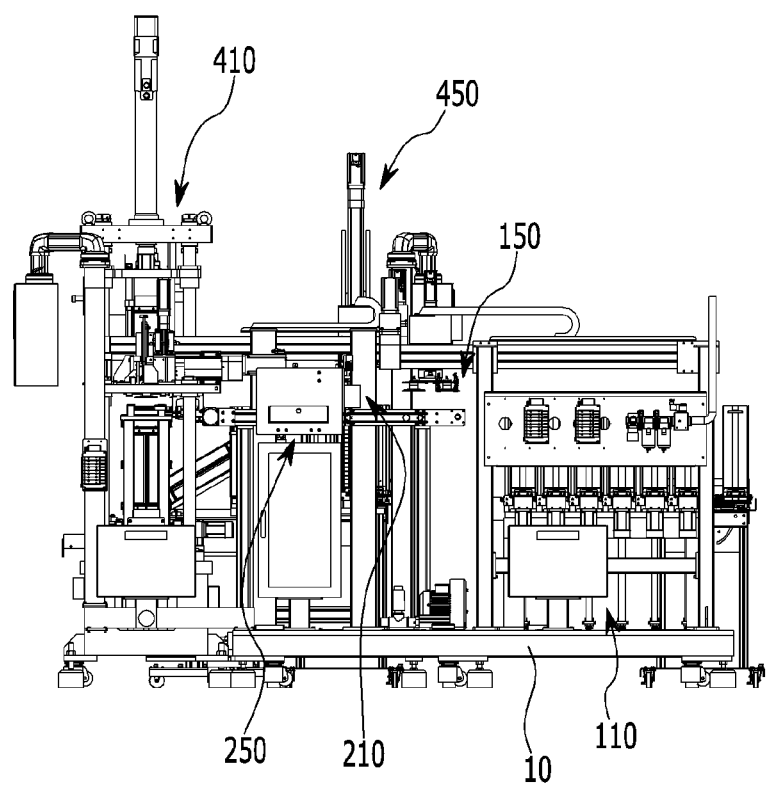
Figure 7:
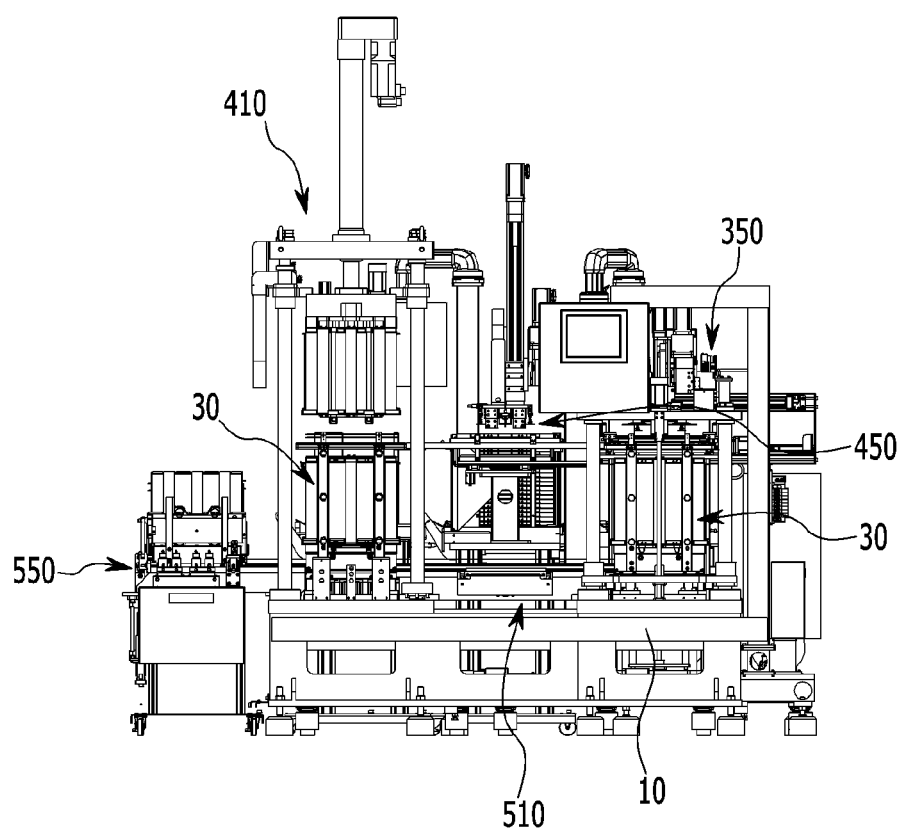

FIGS. 1 to 4 are perspective views illustrating an apparatus for rapidly stacking a fuel cell stack according to an exemplary embodiment of the present invention, and FIGS. 5 to 7 are a top plan view, a rear view, and a side view of the apparatus for rapidly stacking a fuel cell stack according to the exemplary embodiment of the present invention, respectively. Notably, the various processes as listed below may be executed by a controller (e.g., a master controller, an upper controller, etc.) having a processor and a memory.

Figure 8:
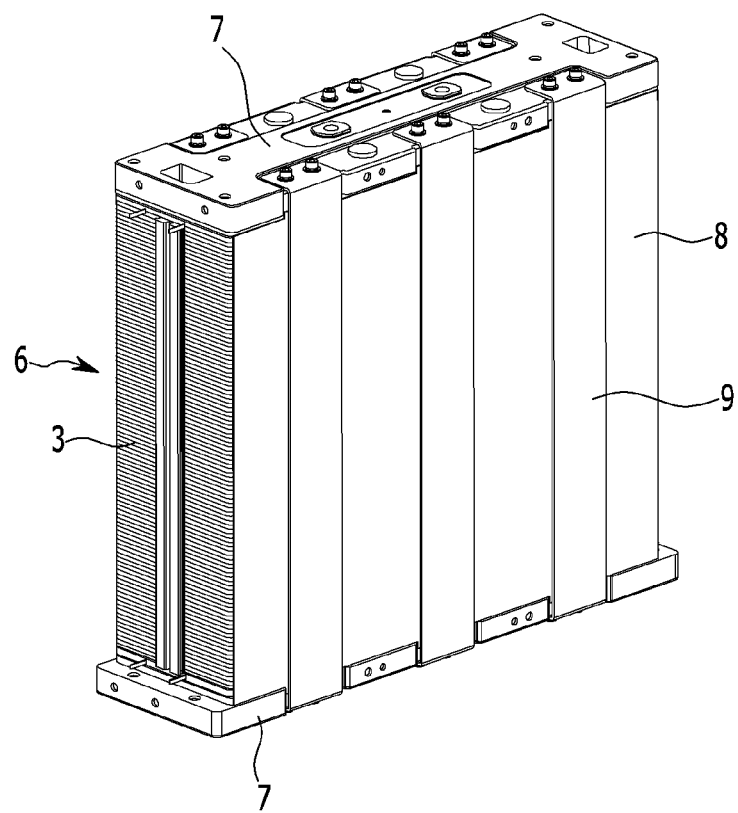
FIG. 8 is a diagram schematically illustrating a fuel cell stack applied to the apparatus for rapidly stacking a fuel cell stack according to the exemplary embodiment of the present invention.

Referring to FIGS. 1 to 7, an apparatus 100 for rapidly stacking a fuel cell stack according to an exemplary embodiment of the present invention may assemble a fuel cell stack 1 (see FIG. 8) by a process of sequentially stacking a plurality of sheets of fuel cells, pressurizing the stacked fuel cells, and fastening the fuel cells together with upper and lower end plates. For example, the fuel cell stack 1 assembled by the apparatus 100 for rapidly stacking a fuel cell stack may include continuously stacked fuel cell components 3, end plates 7 disposed at upper and lower sides of the fuel cell components 3, and a fastening bar 9 configured to fasten the upper and lower end plates with the fuel cell components 3 interposed between the end plates 7 as illustrated in FIG. 8.

Figure 9A:
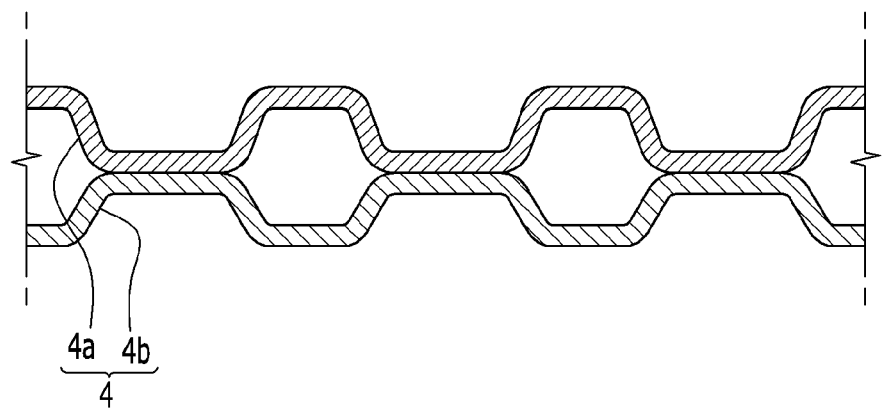
FIGS. 9A-9B are diagrams schematically illustrating a fuel cell component of the fuel cell stack applied to the apparatus for rapidly stacking a fuel cell stack according to the exemplary embodiment of the present invention.
Figure 9B:
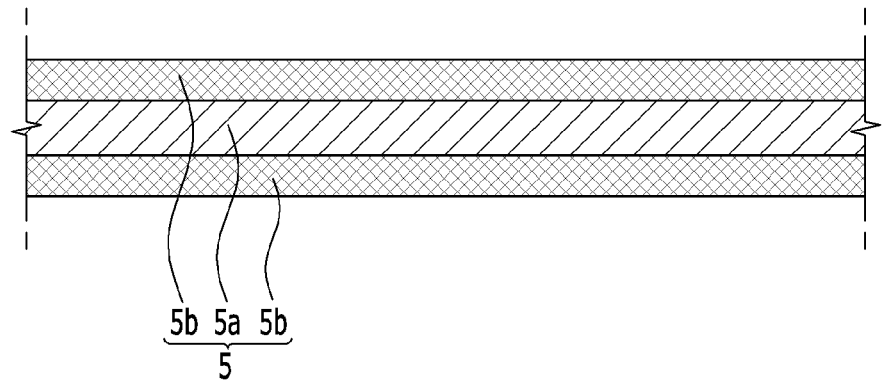

As illustrated in FIG. 9, the fuel cell components 3 may include a separating plate component 4, in which a negative electrode metal separating plate 4a and a positive electrode metal separating plate 4b may be bonded, and a membrane-electrode assembly (MEA) sheet component 5, in which gas diffusion layers (GDL) 5b may be bonded to both surfaces of an MEA 5a. The fuel cell components 3 may be formed into a stack body 6 of the fuel cell stack 1 in which the plurality of sheets of the separating plate components 4 and the MEA sheet component 5 are sequentially and continuously stacked. Reference numeral 8, which is not described in FIG. 8, denotes an insulating plate disposed on a lateral surface of the stack body 6.

Hereinafter, constituent elements of the apparatus 100 for rapidly stacking a fuel cell stack according to the exemplary embodiment of the present invention will be described based on that the separating plate component 4 and the MEA sheet component 5 are stacked vertically. Accordingly, a part facing an upper side of the constituent element may be defined as an upper end part, an upper part, and an upper surface, and a part facing a lower side of the constituent element may be defined as a lower end part, a lower part, and a lower surface.

The apparatus 100 for rapidly stacking a fuel cell stack according to the exemplary embodiment of the present invention has a structure capable of decreasing the required operation hours for assembling the fuel cell stack 1 to improve productivity, and guaranteeing a stack degree of the fuel cell components 3 by automatically stacking and pressurizing the fuel cell components 3. Accordingly, the apparatus 100 may include a lift unit 110, a component pick-up unit 150, a component examining unit 210, a defective component extracting unit 250, a component aligning unit 310, a component stacking unit 350, a component pressurizing unit 410, an end plate loading unit 450, a transferring unit 510, and a stack discharging unit 550. The units may be operated by a controller having a processor and a memory.

The various constituent elements may be formed on a frame 10, and the frame 10 may support the constituent elements and may be formed of one frame or two or more divided frames. The frame 10 may include various accessory elements, such as various brackets, bars, rods, plates, housings, cases, blocks, partition walls, ribs, rails, collars, and height adjusting device, for supporting the constituent elements. However, the various accessory elements are provided for installing respective constituent elements, which are to be described below, in the frame 10, so that in the exemplary embodiment of the present invention, the accessory elements may be collectively referred to as the frame 10 except for an exceptional case.

Figure 10:
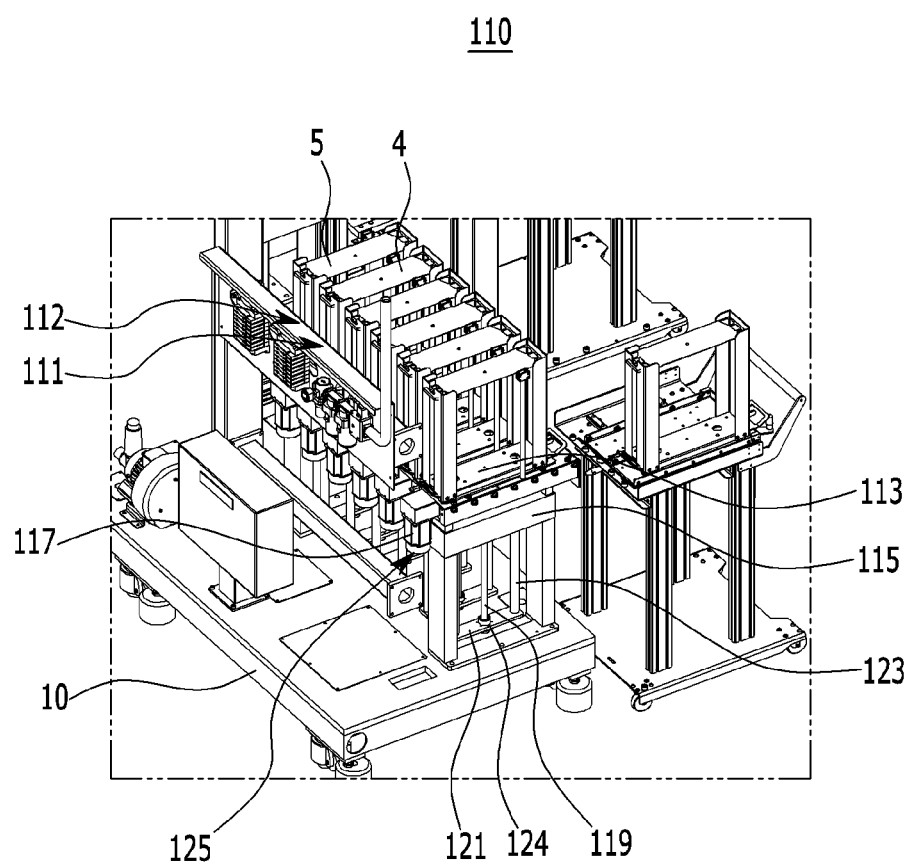
FIG. 10 is a diagram illustrating a lift unit applied to the apparatus for rapidly stacking a fuel cell stack according to the exemplary embodiment of the present invention.

In the exemplary embodiment of the present invention, the lift unit 110 may be configured to support a first magazine 111 in which the separating plate components 4 may be accommodated, and a second magazine 112 in which the MEA sheet components 5 may be accommodated, and may be configured to lift the components when the components are unloaded (see FIG. 10). In particular, the first and second magazines 111 and 112 may accommodate the separating plate components 4 and the MEA sheet components 5, which are stacked vertically, and have a form in which upper and lower ends and front and rear surfaces are opened as illustrated in FIG. 10.

Additionally, lift plates 113 may be installed at the lower opened ends of the first and second magazines 111 and 112 to be vertically movable. The lift plates 113 may support the separating plate components 4 and the MEA sheet components 5 in the first and second magazines 111 and 112, and may be configured to lift the components when the components are unloaded. Particularly, the lift unit 110 may include a lift support frame 115 installed in the frame 10, and a lift driving device 125 installed in the lift support frame 115. The lift support frame 115 may support the first and second magazines 111 and 112. In addition to the pair of first and second magazines 111 and 112, other pairs of first and second magazines 111 and 112 may be disposed on the lift support frame 115. Particularly, the other pairs of first and second magazines 111 and 112 may be buffer magazines to insert a new magazine based on an automation process.

The lift driving device 125 may be configured to vertically move the lift plate 113 of the first and second magazines 111 and 112. In particular, lift driving device 125 may include a lift motor 117 installed to be fixed to the lift support frame 115, a lead screw 119 configured to rotate while being connected to the lift motor 117, a lifting plate 121 screw-engaged with the lead screw 119, and a pair of guide bars 123 coupled with the lifting plate 121 and connected with the lift plate 113. The lead screw 119 may be vertically disposed to rotatably connect an upper end of the lead screw 119 to the support frame 115 and to connect a lower end of the lead screw 119 to the frame 10. The lead screw 119 may be connected with the lift motor 117 by a belt and a pulley (not illustrated), and may be rotated in forward and reverse directions by driving the lift motor 117.

Further, the lifting plate 121 may be screw-engaged with the lead screw 119 by a nut 124, and the lead screw 119 may be rotated in the reverse direction by the driving of the lift motor 117 to guide the lifting plate 121 by the guide bar 123 to be movable in the vertical direction. Additionally, the guide bars 123 may be coupled to both sides of the lifting plate 121, and may be disposed vertically in parallel to the lead screw 119. A lower end of the guide bar 123 may be connected with the lifting plate 121, and the upper end thereof may be connected with the lift plate 113. Accordingly, in the exemplary embodiment of the present invention, the lead screw 119 may be rotated in the reverse direction by the lift motor 117 and the lifting plate 121 may move vertically to thus move the lift plates 113 of the first and second magazines 111 and 112 in the vertical direction.

In the exemplary embodiment of the present invention, the component pick-up unit 150 may be configured to simultaneously pick up (e.g., collect, grip, or unload) one of the separating plate components 4 accommodated in the first magazine 111 and one of the MEA sheet components 5 accommodated in the second magazine 112, and load the components 4 and 5 onto a beginning end (e.g., a start end) of a component transfer route 131 of a conveyor 130. Particularly, the conveyor 130 may be configured to transfer the separating plate components 4 and the MEA sheet components 5 and may be installed in the frame 10. For example, the conveyor 130 may include a conveyor belt configured to travel (e.g., move along) in an endless track through a conveyor roller. Since the conveyor 130 may be formed of a conveyor device that is a well-known technology widely known in the art, a more detailed description of a configuration thereof will be omitted in the present specification. Further, the conveyor 130 may form the component transfer route 131 connected from the lift unit 110 to a component stacking unit 350, which is to be described in more detail below, in an arrangement direction of the first and second magazines 111 and 112.

Figure 11:
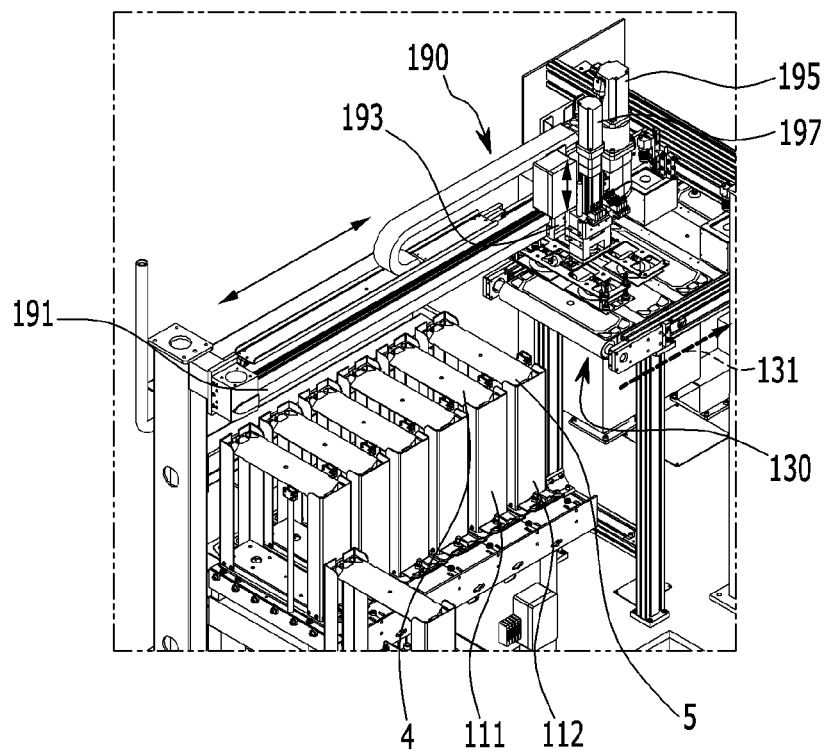
FIGS. 11 and 12 are diagrams illustrating a component pick-up unit applied to the apparatus for rapidly stacking a fuel cell stack according to the exemplary embodiment of the present invention.
Figure 12:
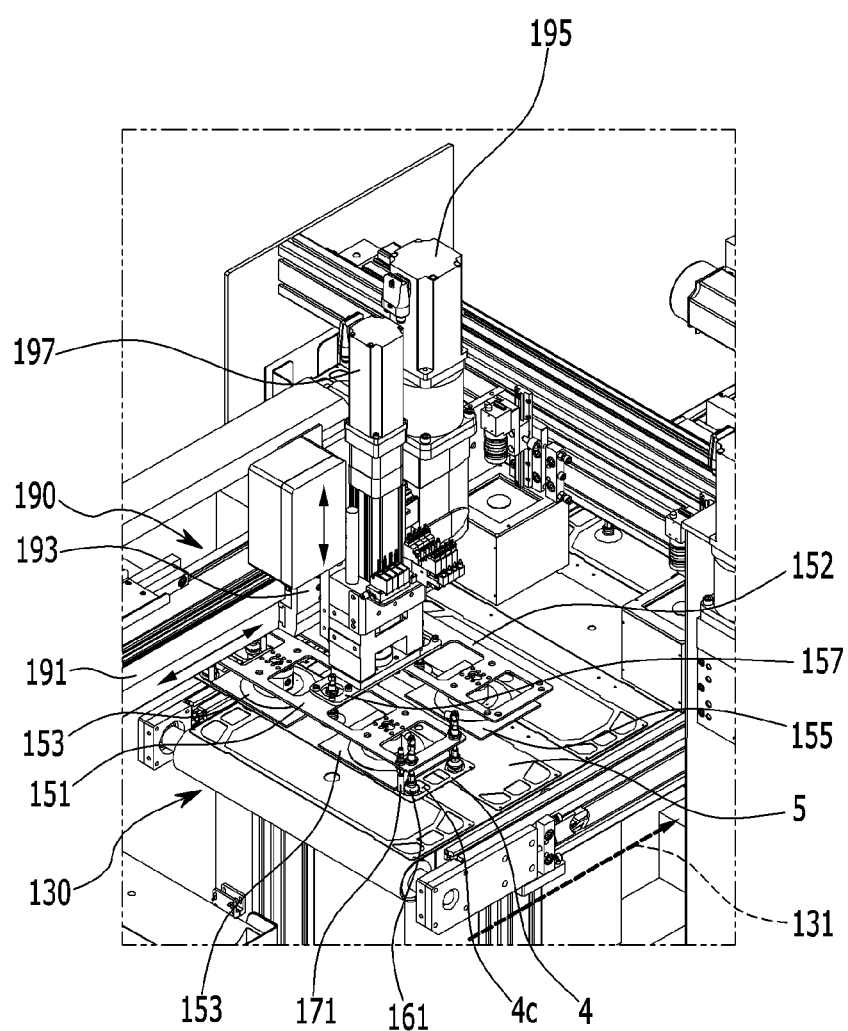

Hereinafter, the lift unit 110 side in the component transfer route 131 may be referred to as a beginning end, the component stacking unit 350 side may be referred to as a completion end, the beginning end side is referred to as a front side, and the completion end side may be referred to as a rear side. The component pick-up unit 150 may include a pair of first and second gripper brackets 151 and 152, a first component gripper 153 installed in the first gripper bracket 151, and a second component gripper 155 installed in the second gripper bracket 152, as illustrated in FIGS. 11 and 12.

In particular, the first and second gripper brackets 151 and 152 may be integrally connected by a connecting bracket 157, and may be installed to reciprocate in the same direction as that of the component transfer route 131 of the conveyor 130 and to reciprocate in the vertical direction by a first driving device 190. The first driving device 190 may include a first guide rail 191 disposed in the same direction as that of the component transfer route 131 of the conveyor 130, a first slider 193 slidably coupled to the first guide rail 191, a first driving motor 195 configured to provide driving force to the first slider 193, and a first driving cylinder 197 coupled to the first slider 193 and connected with the connecting bracket 157.

Accordingly, the first and second gripper brackets 151 and 152 may reciprocate in the same direction as that of the component transfer route 131 of the conveyor 130 based on a straight movement of the first slider 193 along the first guide rail 191 by the driving of the first driving motor 195. Further, the first and second gripper brackets 151 and 152 may vertically reciprocate by the driving of the first driving cylinder 197.

Moreover, the first component gripper 153 may be fixed to a first gripper bracket 151. The first component gripper 153 may be provided by a vacuum cup configured to apply vacuum suction force, and adsorb the separating plate components 4 accommodated in the first magazine 111 with vacuum suction force. The second component gripper 155 may be fixed to the second gripper bracket 152. The second component gripper 155 may be provided by a vacuum cup configured to apply vacuum suction force, and adsorb the MEA sheet components 5 accommodated in the second magazine 112 with vacuum suction force.

The first and second component grippers 153 and 155 may be configured to move straight towards the first and second magazines 111 and 112 and move in the lower direction by the first driving device 190, and vacuum-adsorb the separating plate components 4 and the MEA sheet components 5 accommodated in the first and second magazines 111 and 112, respectively. Further, the first and second component grippers 153 and 155 may be configured to move in the upper direction (e.g., move upwards) by the first driving device while vacuum-adsorbing the separating plate components 4 and the MEA sheet components 5, respectively, and move straight towards the beginning end of the conveyor 130.

Additionally, when vacuum suction force is released when the first and second component grippers 153 and 155 move in the lower direction (e.g., downward) by the first driving device 190, the first and second component grippers 153 and 155 may be configured to load the separating plate component 4 and the MEA sheet component 5 to the beginning end of the component transfer route 131 of the conveyor 130, respectively.

In the meantime, the component pick-up unit 150 according to the exemplary embodiment of the present invention may further include paper grippers 161 and paper separating members 171. When the separating plate component 4 within the first magazine 111 is vacuum-adsorbed by the first component gripper 153, the paper gripper 161 may be configured to simultaneously vacuum-adsorbs a paper 169 (see FIG. 13) interposed between the separating plate components 4. The paper grippers 161 may be fixedly installed in the first gripper bracket 151, and provided by a vacuum cup configured to apply or output vacuum suction force. The paper grippers 161 may be installed at corners of the first gripper bracket 151, and may be configured to vacuum-adsorb the paper 169 through a manifold aperture 4c of the separating plate component 4.

The paper separating member 171 may be configured to separate the paper 169 from the separating plate component 4 and the paper gripper 161 when the vacuum suction force of the paper gripper 161 is released. The paper separating member 171 may be fixedly installed in the first gripper bracket 151, and may be an operating rod configured to move forward and backward in the vertical direction by the operating cylinder. The paper separating members 171 may be installed at respective corners of the first gripper bracket 151, and may be configured to operate or move forward and backward through the manifold aperture 4c of the separating plate component 4, and separate the paper 169 from the separating plate component 4 and the paper gripper 161.

Figure 13:
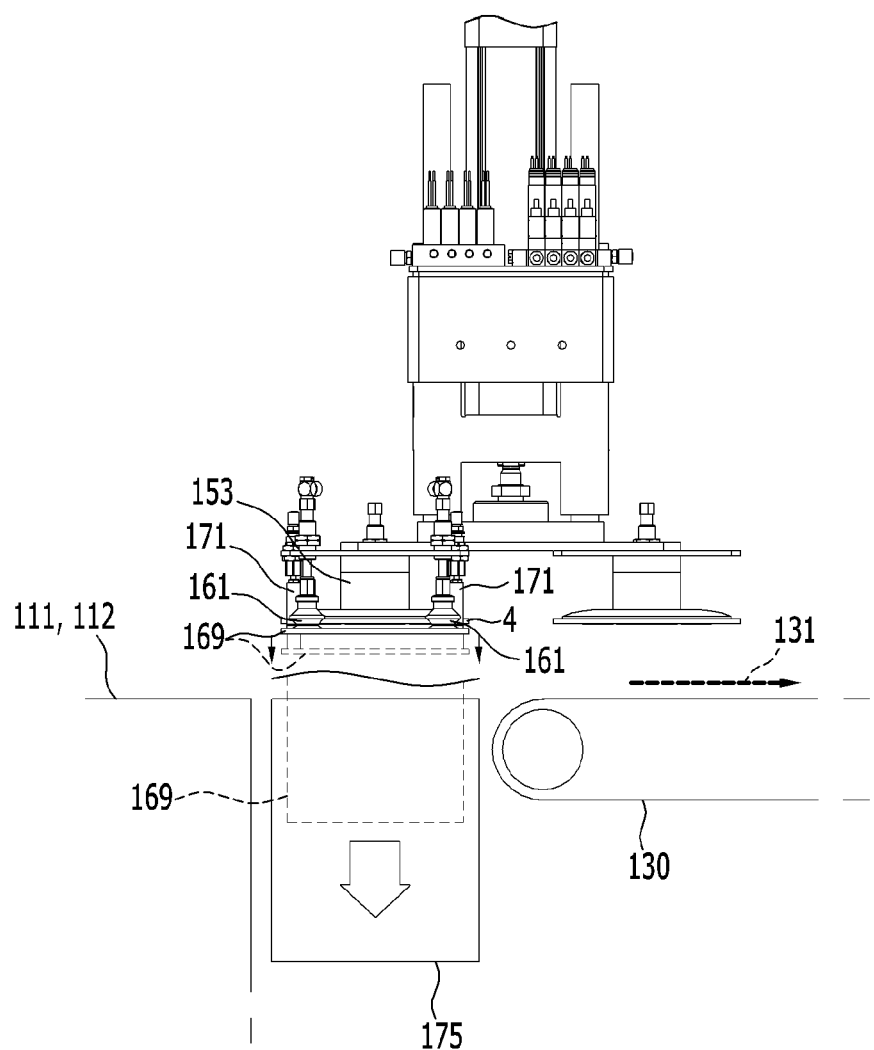
FIG. 13 is a diagram illustrating a paper collecting structure of the component pick-up unit applied to the apparatus for rapidly stacking a fuel cell stack according to the exemplary embodiment of the present invention.

In particular, the paper 169 may be separated from the separating plate component 4 and the paper gripper 161 by the paper separating member 171 during a process in which the paper 169 moves toward the beginning end of the component transfer route 131 of the conveyor 130 while being vacuum-adsorbed to the paper gripper 161 together with the separating plate component 4 vacuum-adsorbed to the first component gripper 153. The paper 169 separated from the separating plate component 4 and the paper gripper 161 may freely fall to and be collected in a paper collecting container 175 installed between the first and second magazines 111 and 112 and the beginning end of the component transfer route 131 of the conveyor 130 as illustrated in FIG. 13. As described above, the paper 169 collected to the paper collecting container 175 may be later recycled.

Figure 14:
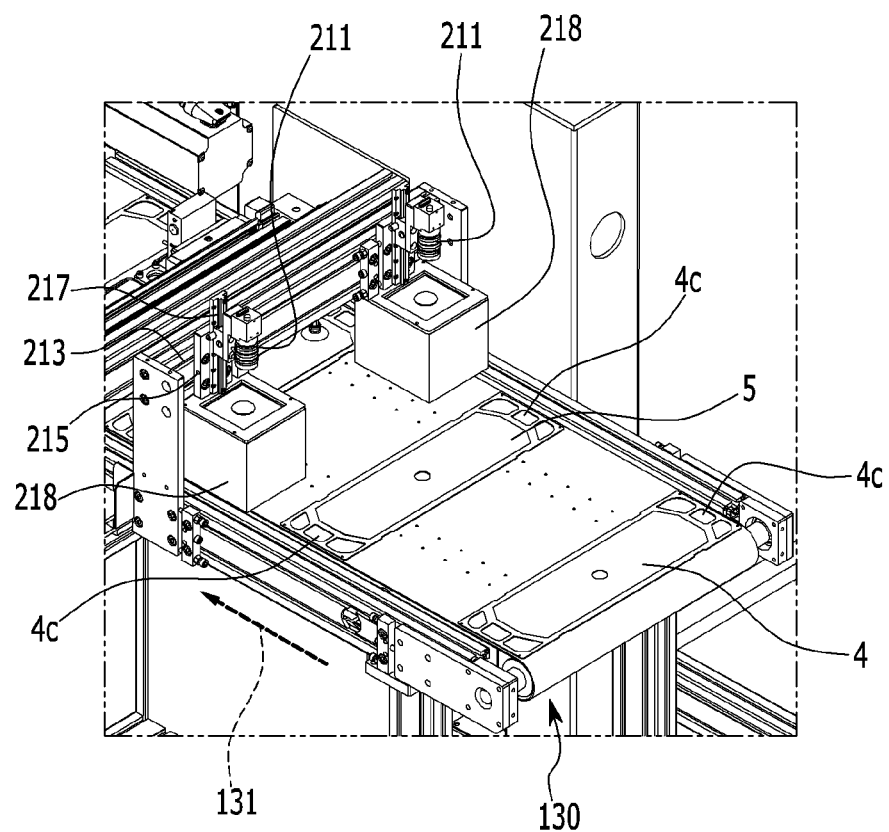
FIG. 14 is a diagram illustrating a component examining unit applied to the apparatus for rapidly stacking a fuel cell stack according to the exemplary embodiment of the present invention.

In the exemplary embodiment of the present invention, the component examining unit 210 may be configured to examine the separating plate component 4 and the MEA sheet component 5 transferred along the component transfer route 131 of the conveyor 130. In other words, the component examining unit 210 may be configured to detect edge locations of the separating plate component 4 and the MEA sheet components 5, and detect whether the separating plate component 4 and the MEA sheet components 5 are defective. The component examining unit 210 may be installed at an upper side of the component transfer route 131 of the conveyor 130. The component examining unit 210 may include a pair of location sensors 211 configured to detect edge locations of the manifold apertures 4c disposed at both sides of the separating plate component 4 and the MEA sheet component 5, and may be configured to output the detection signal to a controller 900 (see FIG. 5) as illustrated in FIG. 14.

The pair of location sensors 211 may correspond to both sides of the separating plate component 4 and the MEA sheet component 5 in a width direction of the conveyor 130, and may be movably installed in the width direction of the conveyor 130. The location sensors 211 may be slidably installed in a first location adjusting rail 213, disposed in the width direction of the conveyor 130, to be slidable in the width direction of the conveyor 130. The location sensors 211 may be mounted in the first location adjusting rail 213 through a moving block 215 to be slidable in the width direction of the conveyor 130.

Further, the location sensor 211 may be mounted to be movable in the vertical direction with respect to the first location adjusting rail 213. Accordingly, a second location adjusting rail 217 may be mounted in the moving block 215 in the vertical direction. The location sensor 211 may be coupled to the second location adjusting rail 217 to be vertically slidable. As a result, the location sensor 211 may move in the width direction of the conveyor 130 along the first location adjusting rail 213, and move in the vertical direction along the second location adjusting rail 217, to adjust a location in correspondence with the manifold apertures 4c of the separating plate component 4 and the MEA sheet component 5.

Since the location sensor 211 may be formed as a vision sensor that is a well-known in the art, thus, a more detailed description of a configuration thereof will be omitted in the present specification. Reference numeral 218, which is not described in the drawing, represents a lighting device configured to irradiate lighting light to the manifold apertures 4c of the separating plate component 4 and the MEA sheet component 5.

In the above, the controller 900 may be configured to execute a general operation of the apparatus 100, and in particular, the controller 900 may be configured to receive a detection signal of the location sensor 211 and determine whether the separating plate component 4 and the MEA sheet component 5 are defective based on predetermined location information (e.g., location information on the edges of the manifold apertures) of the separating plate component 4 and the MEA sheet component 5. In the exemplary embodiment of the present invention, the defective component extracting unit 250 may be configured to grip or grasp each of the separating plate component 4 and the MEA sheet component 5, which are a unit set determined to have a defect by the examination unit 210 and the controller 900, on the conveyor 130, and may be configured to extract the gripped separating plate component 4 and MEA sheet component 5 to the exterior of the conveyor 130 (e.g., remove from the conveyor).

Figure 15:
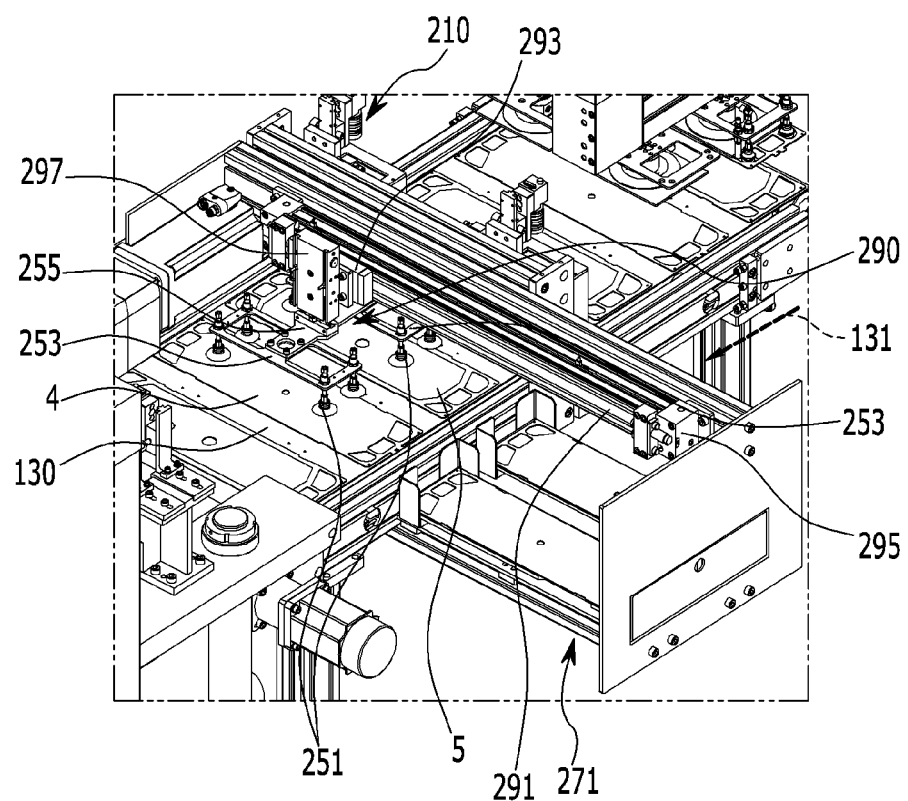
FIG. 15 is a diagram illustrating a defective component extracting unit applied to the apparatus for rapidly stacking a fuel cell stack according to the exemplary embodiment of the present invention.

The defective component extracting unit 250 may be mounted at an upper side of the conveyor 130 at a rear side of the component examining unit 210, and may include a plurality of defective component extracting grippers 251 as illustrated in FIG. 15. The defective component extracting gripper 251 may be configured to simultaneously vacuum-adsorb the separating plate component 4 and the MEA sheet component 5 as the unit set determined to have a defect, and load the components to a tray 271 provided at an external side of the conveyor 130. The defective component extracting grippers 251 may be installed at a pair of fixing brackets 253 provided to correspond to the separating plate component 4 and the MEA sheet component 5 as the unit set, respectively. The pair of fixing brackets 253 may be integrally connected via a connecting member 255. Additionally, the pair of fixing brackets 253 may be mounted to reciprocate in a direction crossing the component transfer route 131 of the conveyor 130 and to reciprocate in the vertical direction by a second driving device 290.

The second driving device 290 may include a second guide rail 291 disposed in a direction crossing the component transfer route 131 of the conveyor 130, a second slider 293 slidably coupled to the second guide rail 291, a second driving motor 295 configured to output (e.g., provide) driving force to the second slider 293, and a second driving cylinder 297 coupled to the second slider 293 and connected to the connecting member 255. Accordingly, the second slider 293 may be configured to move linearly (e.g., substantially straight) along the second guide rail 291 by the driving force of the second driving motor 295, to cause the fixing bracket 253 to reciprocate (e.g., move corresponding to, reciprocal movement) in the direction crossing the component transfer route 131 of the conveyor 130. Further, the fixing bracket 253 may reciprocate in the vertical direction by the driving of the second driving cylinder 297.

In the above, the defective component extracting grippers 251 may be fixedly mounted at corners of each fixing bracket 253. The defective component extracting grippers 251 may be provided by vacuum cups configured to apply vacuum suction force, and adsorb the separate plate component 4 and the MEA sheet component 5 as the unit set determined to have a defect with vacuum suction force. The defective component extracting grippers 251 may be configured to move from the upper side of the conveyor 130 in the lower direction by the second driving device 290, and vacuum-adsorb the separate plate component 4 and the MEA sheet component 5 as the unit set determined to have a defect by the component examining unit 210 and the controller 900.

Further, the defective component extracting grippers 251 may be configured to move in the upper direction by the second driving device 290 while vacuum-adsorbing the separating plate component 4 and the MEA sheet component 5, respectively, and move linearly toward the tray 271 at the external side of the conveyor 130 in the direction crossing the component transfer route 131 of the conveyor 130. When the vacuum suction force is released when the defective component extracting grippers 251 move in the lower direction by the second driving device 290, the defective component extracting grippers 251 may be configured to load the separating plate component 4 and the MEA sheet component 5 on the tray 271. The tray 271 may accommodate the separate plate component 4 and the MEA sheet component 5 as the unit set determined to have a defect, and may be fixedly mounted in the frame 10 at the external side of the conveyor 130.

In the exemplary embodiment of the present invention, the component aligning unit 310 may be configured to align the separating plate component 4 and the MEA sheet component 5 transferred via the conveyor 130 to predetermined locations. In other words, the component aligning unit 310 may be configured to align the separating plate component 4 and the MEA sheet component 5 transferred from the rear side to predetermined locations of the completion end of the component transfer route 131 of the conveyor 130. Particularly, each of the separating plate component 4 and the MEA sheet component 5 transferred to the completion end of the component transfer route 131 of the conveyor 130 may be gripped by a component stacking unit 350, which is to be described in more detail below, and loaded onto the component aligning unit 310 side.

Figure 16:
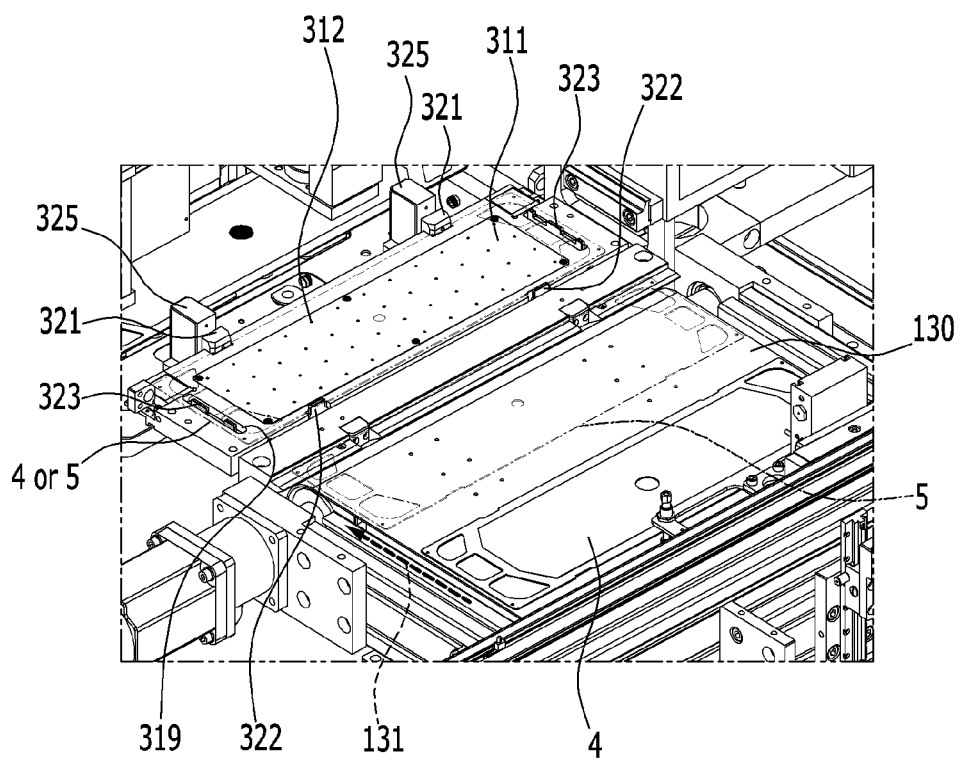
FIGS. 16 and 17 are diagrams illustrating a component alignment unit applied to the apparatus for rapidly stacking a fuel cell stack according to the exemplary embodiment of the present invention.
Figure 17:
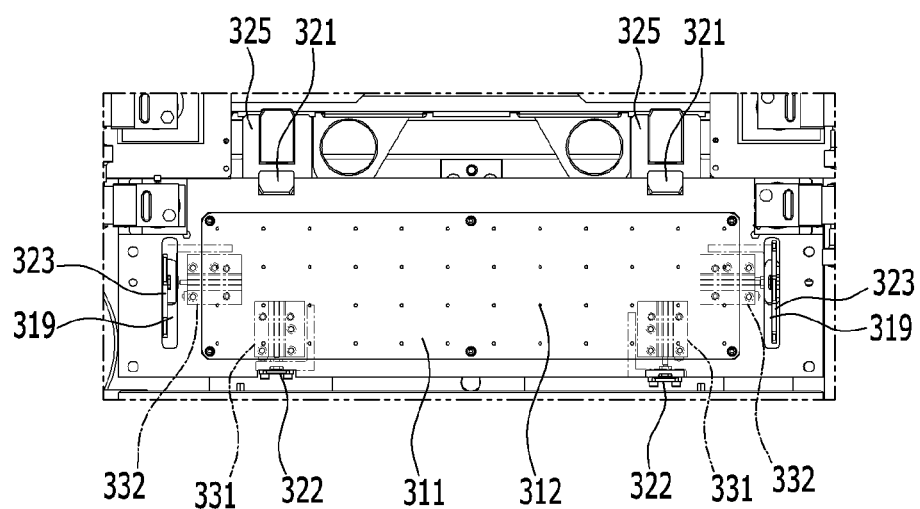

The component aligning unit 310 may be mounted in the frame 10 to be connected with the completion end of the component transfer route 131 of the conveyor 130, and may include a single base plate 311 and a plurality of touch members 321, 322, and 323 mounted in the base plate 311 as illustrated in FIGS. 16 and 17. The base plate 311 may be configured to support each of the separating plate component 4 and the MEA sheet component 5, and may be fixed in the frame 10 at about the same height as that of the conveyor 130 at the completion end side of the component transfer route 131 of the conveyor 130. The base plate 311 may be formed in a quadrangular plate shape.

Furthermore, a plurality of air exhaust apertures 312 may be formed in the base plate 311 to discharge air and raise the separating plate component 4 and the MEA sheet component 5 to a predetermined height with pressure of the air. The air exhaust apertures 312 may be connected with a compressed air supply device (not illustrated) configured to supply compressed air. The touch members 321, 322, and 323 touch edge portions of the separating plate component 4 and the MEA sheet component 5, and align the components to predetermined locations when the separating plate component 4 and the MEA sheet component 5 are raised while the compressed air is discharged through the air exhaust apertures 312 of the base plate 311. In the exemplary embodiment of the present invention, the touch members 321, 322, and 323 may be divided into a first touch member 321, a second touch member 322, and a third touch member 323.

The first touch member 321 may be fixedly mounted at a rear external side of the base plate 311, fitted to an edge portion of the rear side of the base plate 311, and may be configured to touch (e.g., come in contact with, abut, etc.) the edge portions of the rear sides of the separating plate component 4 and the MEA sheet component 5. The first touch member 321 may be installed at a pair of fixed bars 325 disposed at the rear external side of the base plate 311 in the vertical direction, and fixed to the frame 10. In other words, the first touch member 321 may be fixedly mounted to each of the fixed bars 325 at the rear external side of the base plate 311.

The second touch member 322 may be movably installed at a front external side of the base plate 311 in a front and rear direction, fitted to edge portions of the front side of the base plate 311, and may be configured to touch the edge portions of the front sides of the separating plate component 4 and the MEA sheet component 5. The second touch member 322 may be configured to push the separating plate component 4 and the MEA sheet component 5 from the front side to the rear side of the base plate 311 while touching the front edge portion of the separating plate component 4 and the MEA sheet component 5. Accordingly, the second touch member 322 may be installed to reciprocate in the front and rear direction by a first touch cylinder 331 fixedly disposed on a lower surface of the base plate 311.

The third touch member 323 may be movably installed at both sides of the base plate 311 in the direction of the side, and may be configured to touch edge portions of both sides of the separating plate component 4 and the MEA sheet component 5 while passing through both sides of the base plate 311. The third touch member 323 may be configured to push the separating plate component 4 and the MEA sheet component 5 in the directions of both sides of the base plate 311 while touching the edge portions of both sides of the separating plate component 4 and the MEA sheet component 5. Accordingly, the third touch member 323 may be installed to reciprocate in the side direction by a second touch cylinder 332 fixedly disposed on the lower surface of the base plate 311. In particular, the third touch member 323 may protrude upward from an upper surface of the base plate 311 through an aperture 319 formed at both sides of the base plate 311, and may be connected to the second touch cylinder 332.

In the exemplary embodiment of the present invention, the component stacking unit 350 may be configured to grip the separating plate component 4 and the MEA sheet component 5 aligned by the component aligning unit 310, and stack the components on a stack guide 30 disposed to be transferred in the direction crossing the component transfer route 131 of the conveyor 130. Further, the component stacking unit 350 may be configured to grip the separating plate component 4 and the MEA sheet component 5 disposed at the completion end side of the conveyor 130 and transfer the gripped separating plate component 4 and MEA sheet component 5 to the component aligning unit 310.

Figure 18:
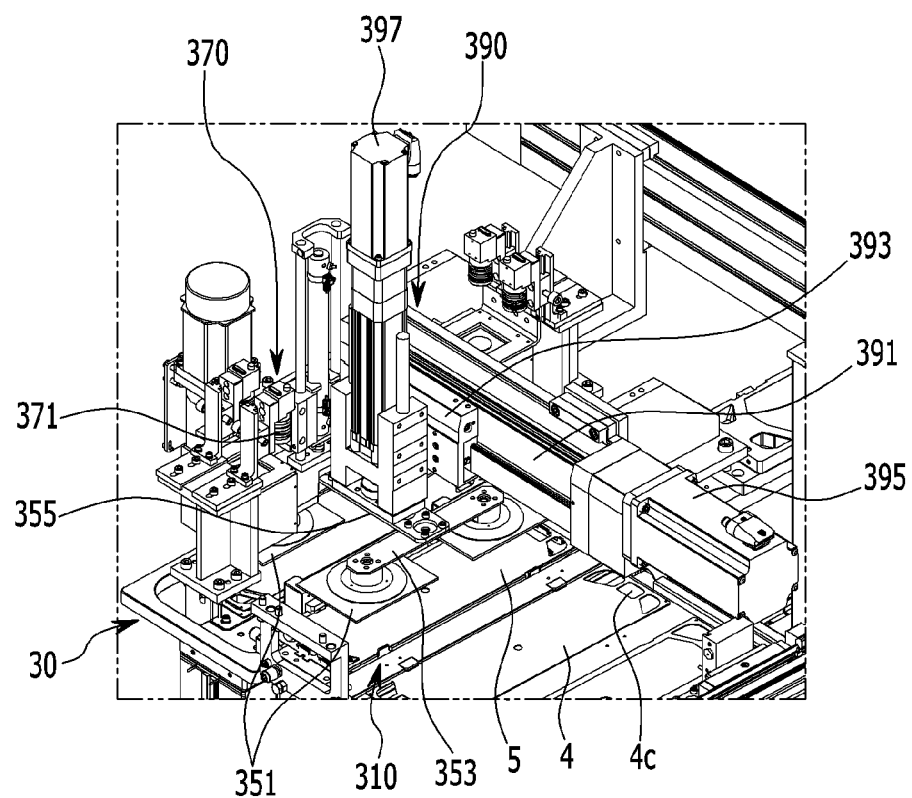
FIGS. 18 and 19 are diagrams illustrating a component stacking unit applied to the apparatus for rapidly stacking a fuel cell stack according to the exemplary embodiment of the present invention.
Figure 19:
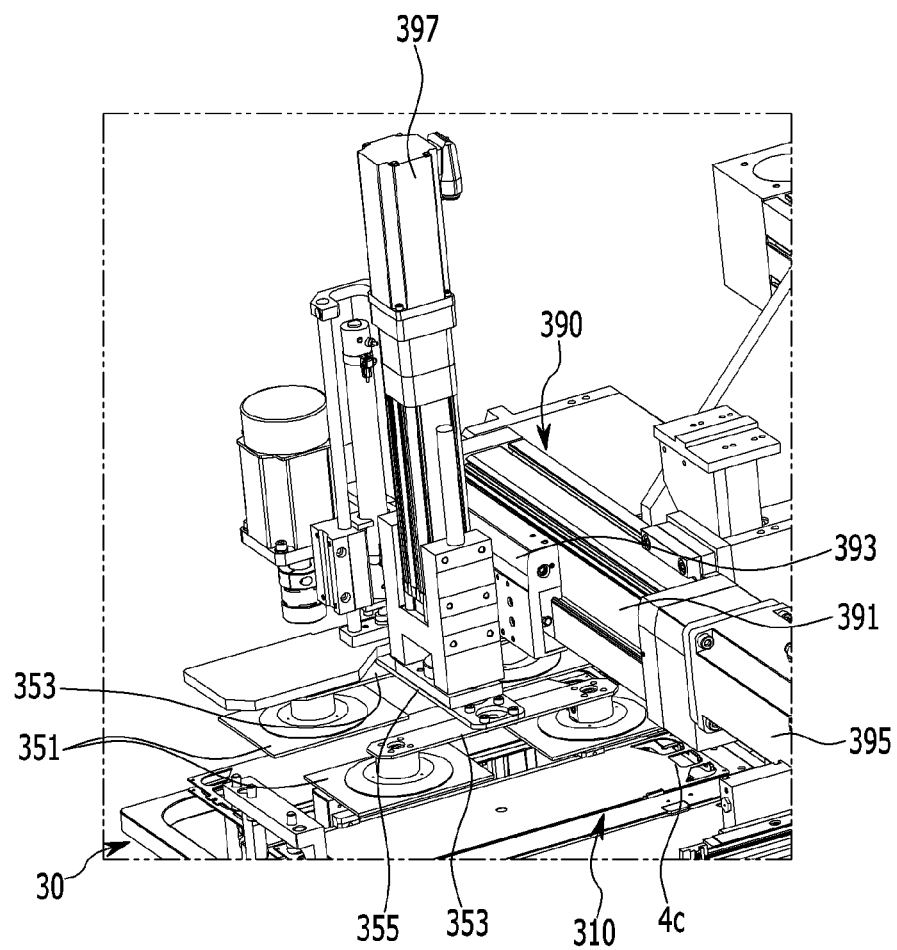

Particularly, the stack guide 30 may be a guide mechanism configured to sequentially stack the separating plate component 4 and the MEA sheet component 5, and may be configured to guide the edge portions of the components 4 and 5 in the vertical direction. The component stacking unit 350 may be configured at an upper side of the component aligning unit 310 at the completion end side of the component transfer route 131 of the conveyor 130. As illustrated in FIGS. 18 and 19, the component stacking unit 350 may be disposed at an upper side of a beginning end of a transfer route of the stack guide 30, installed to reciprocate in the transfer direction of the separating plate component 4 and the MEA sheet component 5, and may include a pair of stack grippers 351 installed to reciprocate in the vertical direction. In particular, the stack guide 30 and the components stacked on the stack guide 30 may be transferred along the transfer route of the stack guide 30 and may be a direction crossing the component transfer route 131 of the conveyor 130.

The pair of stack grippers 351 may be configured to vacuum-adsorb the separating plate component 4 and the MEA sheet component 5. Particularly, the pair of stack grippers 351 may be configured to vacuum-adsorb any one component of the separating plate component 4 and the MEA sheet component 5 disposed at the completion end side of the conveyor 130, and load the vacuum-adsorbed component to the component aligning unit 310. Further, the pair of stack grippers 351 may be configured to vacuum-adsorb the other component located in the component aligning unit 310 and load the vacuum-adsorbed component to the stack guide 30.

The stack grippers 351 may be installed at a pair of mounting brackets 353 to correspond to an upper side of the completion end of the component transfer route 131 of the conveyor 130 and the upper side of the component aligning unit 310. The pair of mounting brackets 353 may be integrally connected via a connecting plate 355. Further, the pair of mounting brackets 353 may be installed to reciprocate in the same direction as that of the component transfer route 131 of the conveyor 130 and may be installed to reciprocate in the vertical direction by a third driving device 390.

Particularly, the third driving device 390 may include a third guide rail 391 disposed in the same direction as that of the component transfer route 131 of the conveyor 130, a third slider 393 slidably coupled to the third guide rail 391, a third driving motor 395 configured to provide driving force to the third slider 393, and a third driving cylinder 397 coupled to the third slider 393 and connected with the connecting plate 355. Accordingly, the mounting bracket 353 may reciprocate in the same direction as that of the component transfer route 131 of the conveyor 130 based on a linear movement of the third slider 393 along the third guide rail 391 by the driving force of the third driving motor 395. Further, the mounting bracket 353 may reciprocate in the vertical direction by the driving of the third driving cylinder 397.

In the above, the stack gripper 351 may be fixedly mounted to each of the mounting brackets 353. The stack gripper 351 may be provided by a vacuum cup configured to apply vacuum suction force. Additionally, the stack grippers 351 may be configured to vacuum-adsorb any one component of the separating plate component 4 and the MEA sheet component 5 disposed at the completion end side of the conveyor 130, and the other component disposed in the component aligning unit 310. The stack grippers 351 may be configured to move in the lower direction by the third driving device 390 from the upper side of the completion end of the component transfer route 131 of the conveyor 130 and the upper side of the component aligning unit 310. The stack grippers 351 may further be configured to move in the lower direction, and vacuum-adsorb any one component of the separating plate component 4 and the MEA sheet component 5 disposed at the completion end side of the conveyor 130, and the other component disposed in the component aligning unit 310.

In addition, the stack grippers 351 may be configured to move in the upper direction by the third driving device 390 while vacuum-adsorbing the component, and move linearly toward the aforementioned stack guide 30 in the same direction as that of the component transfer route 131 of the conveyor 130. Further, when the vacuum suction force is released while the stack grippers 351 move in the lower direction by the third driving device 390, the stack grippers 351 may be configured to load any one component of the separating plate component 4 and the MEA sheet component 5 to the component aligning unit 310, and load the other component to the stack guide 30.

In the exemplary embodiment of the present invention, the component stacking unit 350 may further include a lifting device configured to move the separating plate component 4 and the MEA sheet component 5 from the upper side to the lower side of the stack guide 30 when the separating plate component 4 and the MEA sheet component 5 are stacked on the stack guide 30 by the stack grippers 351. The lifting device (not illustrated) may be configured to move a mechanism that supports the components of the separating plate component 4 and the MEA sheet component 5 from the upper side to the lower side or from the lower side to the upper side by driving a motor or an operation cylinder inside the stack guide 30.

Moreover, in the exemplary embodiment of the present invention, a stack examining unit 370 may be configured to examine the separating plate component 4 and the MEA sheet component 5 stacked on the stack guide 30 and may be mounted at the component stacking unit 350 side. Further, the stack examining unit 370 may include a plurality of vision sensors 371 fixedly mounted in the frame 10 to correspond to a component stack region of the stack guide 30. The vision sensors 371 may be configured to detect a stack degree of the separating plate component 4 and the MEA sheet component 5 stacked on the stack guide 30. The vision sensors 371 may be fixedly mounted in the frame 10 to correspond to both manifold apertures 4c of the separating plate component 4 and the MEA sheet component 5 stacked on the stack guide 30. Particularly, pair of vision sensors 371 may be disposed to correspond to both manifold apertures 4c of each of the separating plate component 4 and the MEA sheet component 5 stacked on the stack guide 30.

Additionally, each vision sensor 371 may be configured to vision-capture (e.g., photograph) the both manifold apertures 4c of the separating plate component 4 and the MEA sheet component 5 stacked on the stack guide 30, and output vision data to the controller 900 (see FIG. 5). Accordingly, the controller 900 may be configured to receive the vision data of the vision sensor 371, and determine whether a stack degree of the components is insufficient based on a predetermined stack degree of the separating plate component 4 and the MEA sheet component 5. In particular, when the controller 900 determines that the stack degree of the separating plate component 4 and the MEA sheet component 5 is insufficient, the aforementioned component stacking unit 350 may be operated by the controller 900, and may be configured to extract the separating plate component 4 and the MEA sheet component 5 from the stack guide 30 (e.g., remove the components from the stack guide).

In the exemplary embodiment of the present invention, the component pressurizing unit 410 may be configured to pressurize the separating plate components 4 and the MEA sheet components 5 continuously stacked on the stack guide 30 by the component stacking unit 350. In other words, when the separating plate components 4 and the MEA sheet components 5 are continuously stacked on the stack guide 30, and the stack guide 30 is transferred along the transfer route (e.g., the transfer route of the stack guide), the component pressurizing unit 410 may be configured to pressurize the separating plate components 4 and the MEA sheet components 5 stacked on the stack guide 30 by a press method.

Figure 20:
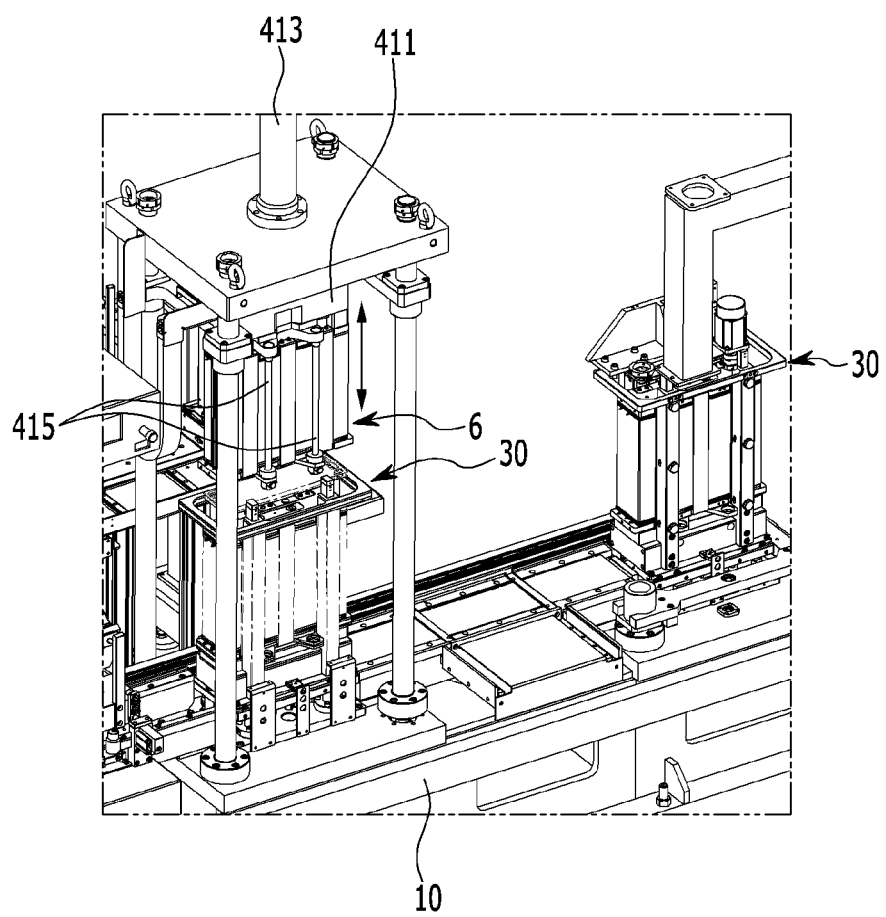
FIGS. 20 and 21 are diagrams illustrating a component pressurizing unit applied to the apparatus for rapidly stacking a fuel cell stack according to the exemplary embodiment of the present invention.
Figure 21:
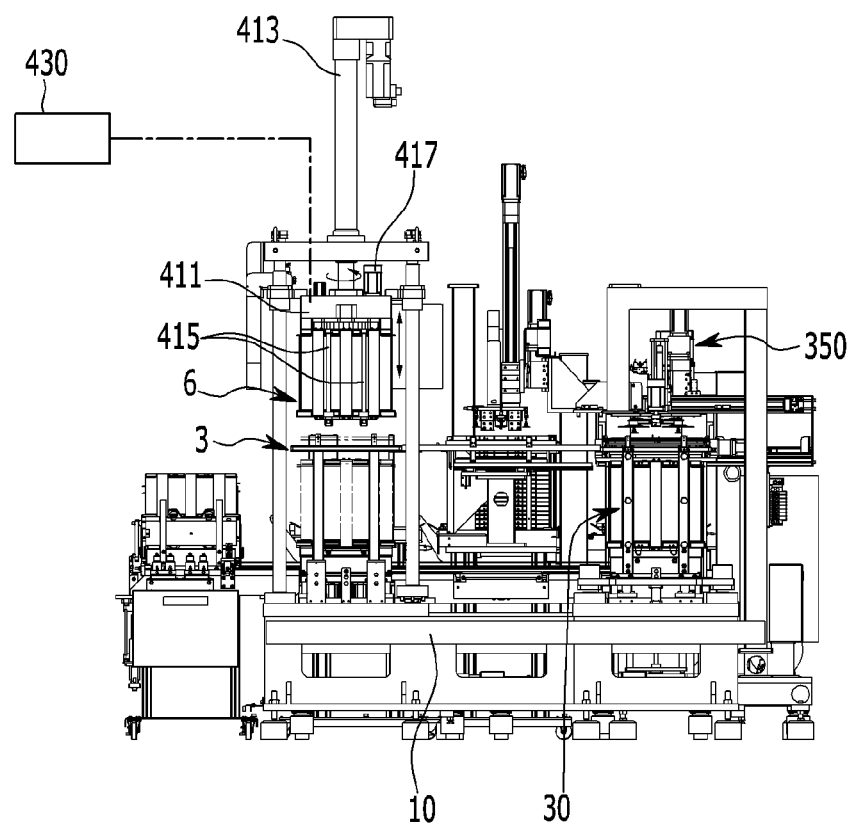

The component pressurizing unit 410 may be disposed at the upper side of the transfer route of the stack guide 30 and may include a press member 411 installed to reciprocate in the vertical direction as illustrated in FIGS. 20 and 21. The press member 411 may be mounted in the frame 10, disposed at the upper side of the transfer route of the stack guide 30, and installed to reciprocate in the vertical direction to an inner side of the stack guide 30. In particular, press member 411 may reciprocate in the vertical direction by a press cylinder 413 fixedly mounted in the frame 10. In particular, the press cylinder 413 may be configured to cause (e.g. provide movement to) the press member 411 to reciprocate in the vertical direction by forward/backward operations.

Furthermore, a pair of fixing rods 415 may be mounted in the press member 411 and may fix the stack body 6, in which the separating plate components 4 and the MEA sheet components 5 are stacked, separately from the stack guide 30. An upper end of the fixing rod 415 may be fixed to the press member 411, and a lower end of the fixing rod 415 may be coupled with a part supporting the lowermost part of the stack body 6 within the stack guide 30. Accordingly, in the exemplary embodiment of the present invention, the part supporting the lowermost part of the stack body 6 may be coupled to the lower end of the fixing rod 415 when the separating plate components 4 and the MEA sheet components 5 stacked on the stack guide 30 are pressurized by the press member 411. When the press member 411 moves in the upper direction through a press cylinder 413, the stack body 6 may be separated to the external side (upper side) of the stack guide 30.

In the exemplary embodiment of the present invention, the press member 411 may be supported by the press cylinder 413, and may be rotatable by a press motor 417. In other words, the press member 411 may be rotated 360° by the press motor 417 while moving in the upper direction by the press cylinder 413. The press member 411 may be rotated by the press motor 417 to mount the aforementioned insulating plate 8 and the fastening bar 9 in the stack body 6 while rotating the stack body 6 when the stack body 6 is separated from the external side (upper side) from the stack guide 30 as described above.

An air-tightness examining unit 430 may be installed to be connected to the press member 411 according to the exemplary embodiment of the present invention. The air-tightness examining unit 430 may be configured to detect air-tightness (e.g., a seal, an airtight seal, etc.) of the stack body 6 while supplying a fluid to the stack body 6 of the separating plate components 4 and the MEA sheet components 5 pressurized by the press member 411. The air-tightness examining unit 430 may further be configured to supply hydrogen gas, air, and a cooling medium to the separating plate component 4 and the MEA sheet component 5 of the stack body 6, measure pressure of the hydrogen gas, the air, and the cooling medium of the separating plate component 4 and the MEA sheet component 5, and detect air-tightness of the stack body 6. In other words, the supply of the cooling component may facilitate detection of a seal.

In the exemplary embodiment of the present invention, the end plate loading unit 450 may be configured to grip the upper and lower end plates 7 of the fuel cell stack 1 and load the gripped end plates 7 onto the stack guide 30. In particular, the end plate loading unit 450 may be configured to grip the end plates 7 separately accommodated in the frame 10 one by one (e.g., individually) and load the gripped end plate 7 to the stack guide 30 in an unloaded state. The end plate 7 loaded onto the stack guide 30 in the unloaded state may be provided as a lower end plate. Further, the end plate loading unit 450 may be configured to load the end plate to the stack guide 30, in which the separating plate components 4 and the MEA sheet components 5 are stacked by the component stacking unit 350. The end plate 7 loaded onto the stack guide 30, on which the separating plate components 4 and the MEA sheet components 5 are stacked, may be provided as an upper end plate. Further, the upper and lower end plates 7 may be fastened by the aforementioned fastening bar 9.

Figure 22:
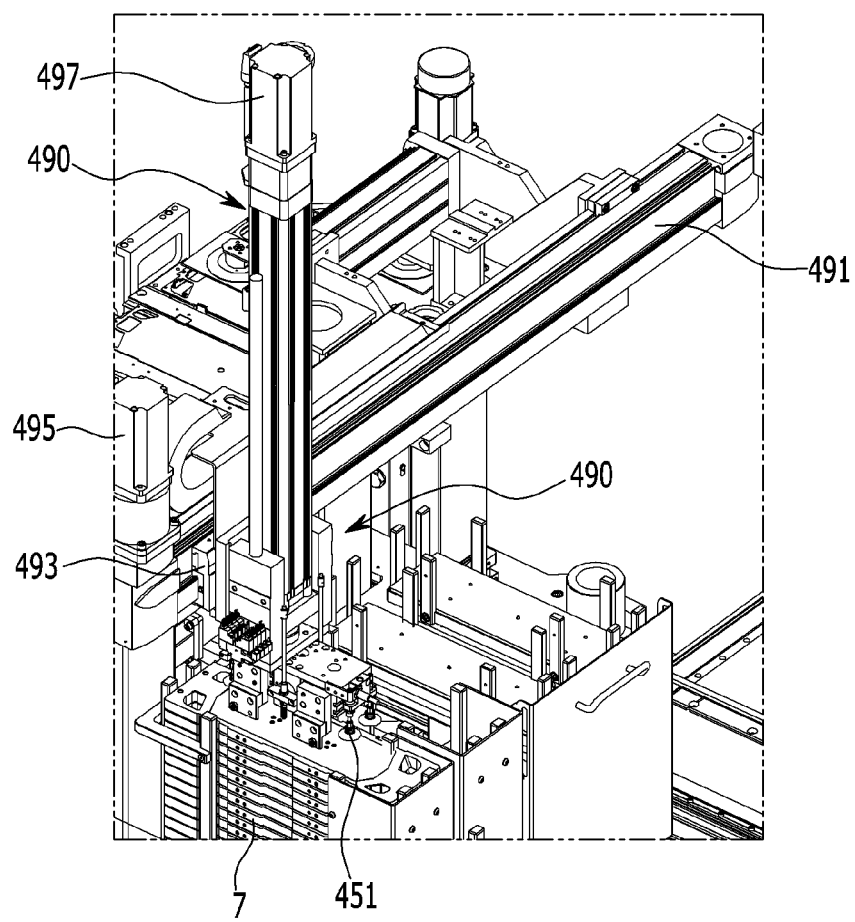
FIG. 22 is a diagram illustrating an end plate loading unit applied to the apparatus for rapidly stacking a fuel cell stack according to the exemplary embodiment of the present invention.

The end plate loading unit 450 may be disposed at the external side of the transfer route of the stack guide 30 between the component stacking unit 350 and the component pressurizing unit 410. Additionally, the end plate loading unit 450 may include end plate grippers 451 configured to vacuum-adsorb the end plate 7 as illustrated in FIG. 22. The end plate gripper 451 may be configured to grip the end plate 7 separately accommodated at the external side of the transfer route of the stack guide 30 and load the end plate 7 to the stack guide 30 on the transfer route of the stack guide 30. The end plate gripper 451 may be provided by a vacuum cup configured to apply vacuum suction force, and adsorb the end plate 7 with vacuum suction force.

The end plate gripper 451 may reciprocate in the direction crossing the transfer route of the stack guide 30 by a fourth driving device 490, and may reciprocate in the vertical direction. Particularly, the fourth driving device 490 may include a fourth guide rail 491 disposed in the direction crossing the transfer route of the stack guide 30, a fourth slider 493 slidably coupled to the fourth guide rail 491, a fourth driving motor 495 configured to provide driving force to the fourth slider 493, and a fourth driving cylinder 497 coupled to the fourth slider 493 and connected with the end plate gripper 451.

Accordingly, the end plate gripper 451 may reciprocate in the direction crossing the transfer route of the stack guide 30 based on a linear movement of the fourth slider 493 along the fourth guide rail 491 by the driving of the fourth driving motor 495. Further, the end plate gripper 451 may reciprocate in the vertical direction by the driving of the fourth driving cylinder 497. The end plate gripper 451 may be configured to move in the lower direction by the fourth driving device 490 from the upper sides of the end plates 7 separately accommodated at the external side of the transfer route of the stack guide 30, and vacuum-adsorb the end plate 7.

The end plate gripper 451 may further be configured to move in the upper direction by the fourth driving device 490 while vacuum-adsorbing the end plate 7, and move linearly in the direction crossing the transfer route of the stack guide 30. In other words, the end plate gripper 451 may be configured to move linearly toward the stack guide 30 on the transfer route from the external side of the transfer route of the stack guide 30. When vacuum suction force is released while the end plate gripper 451 moves in the lower direction by the fourth driving device 490, the end plate gripper 451 may be configured to load the end plate 7 onto the stack guide 30.

In the exemplary embodiment of the present invention, the transferring unit 510 may be configured to transfer the stack guide 30, on which the separating plate component 4 and the MEA sheet component 5 are stacked by the component stacking unit 350, from the beginning end of the transfer route of the stack guide 30 to the component pressurizing unit 410 side. Further, the transferring unit 510 may be configured to transfer the stack body 6, in which the separating plate components 4 and the MEA sheet components 5 are stacked by the component pressurizing unit 410, from the component pressurizing unit 410 to the completion end of the transfer route of the stack guide 30, separately from the stack guide 30.

Figure 23:
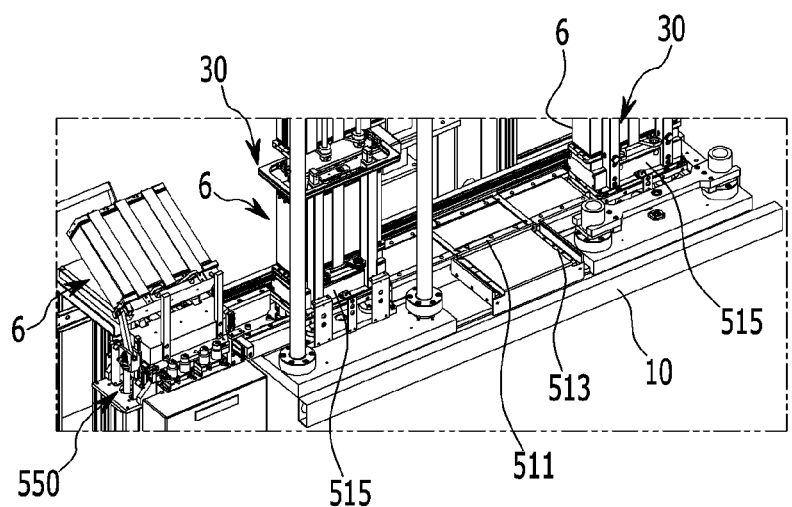
FIG. 23 is a diagram illustrating a transferring unit applied to the apparatus for rapidly stacking a fuel cell stack according to the exemplary embodiment of the present invention.

The transferring unit 510 may include a first transfer rail 511, a second transfer rail 513, and first transfer stages 515, as illustrated in FIG. 23. The first transfer rail 511 may be mounted in the frame 10 of the sides of the component stacking unit 350 and the component pressurizing unit 410. The first transfer rail 511 may connect the beginning end and the completion end of the transfer route of the stack guide 30, and may be disposed in the direction crossing the component transfer route 131 of the conveyor 130. The second transfer rail 513 may be connected with the first transfer rail 511 while crossing the first transfer rail 511 in a direction distant from the end plate loading unit 450 between the component stacking unit 350 and the component pressurizing unit 410.

Further, a pair of first transfer stages 515 may be disposed to correspond to the component stacking unit 350 and the component pressurizing unit 410, respectively. The first transfer stages 515 may be configured to support the stack guide 30 between the component stacking unit 350 and the component pressurizing unit 410 and move along the first and second transfer rails 511 and 513. The first transfer stage 515 may be slidably coupled to the first and second transfer rails 511 and 513 via a separate driving device (not illustrated). Since the driving device may be formed of a rail slide moving device as is well known in the art, a more detailed description of a configuration thereof will be omitted in the present specification.

Accordingly, in the exemplary embodiment of the present invention, the stack guide 30 may be configured to move along the first and second transfer rails 511 and 513 between the component stacking unit 350 and the component pressurizing unit 410 while being supported by the first transfer stage 515. Further, the aforementioned end plate loading unit 450 may be configured to load the lower end plate 7 to the stack guide 30 in the unloaded state, in which the stack body 6 is separated, on the first transfer rail 511 between the component stacking unit 350 and the component pressurizing unit 410. The end plate loading unit 450 may be configured to load the upper end plate 7 to the stack guide 30, on which the separating plate component 4 and the MEA sheet component 5 are stacked by the component stacking unit 350.

Particularly, the second transfer rail 513 may be provided as an evasion section for evading the stack guide 30, onto which the lower end plate 7 is loaded, from the first transfer rail 511 by the first transfer stage 515. Particularly, the component pressurizing unit 410 may be configured to pressurize the separating plate component 4 and the MEA sheet component 5 stacked on the stack guide 30 through the press member 411, and lift (e.g., raise) the stack body 6 of the components and separate the stack body 6 from the stack guide 30 while the separating plate component 4 and the MEA sheet component 5 are stacked on the stack guide 30 by the component stacking unit 350.

Then, the component pressurizing unit 410 may be configured to load the stack body 6 onto the stack discharging unit 550, which is to be described below, while the stack body 6 is rotated by the component pressurizing unit 410 and the insulating plate 8 and the fastening bar 9 are mounted to the stack body 6. The stack guide 30, from which the stack body 6 is separated, may be configured to move toward the end plate loading unit 450 along the first transfer rail 511 by the first transferring stage 515, and the end plate loading unit 450 may be configured to load the lower end plate 7 onto the stack guide 30 in the unloaded state.

Further, the stack guide 30, onto which the lower end plate 7 is loaded, may be configured to move along the first transfer rail 511 by the first transfer stage 515 and enter the second transfer rail 513 of the evasion section. Then, the stack guide 30, on which the separating plate component 4 and the MEA sheet component 5 are stacked by the component stacking unit 350, may be configured to move toward the end plate loading unit 450 along the first transfer rail 511 by the first transfer stage 515. The end plate loading unit 450 may be configured to load the upper end plate 7 onto the stack guide 30, on which the separating plate component 4 and the MEA sheet component 5 are stacked. Accordingly, the stack guide 30, onto which the end plate 7 is loaded, may be configured to move toward the component pressurizing unit 410 along the first transfer rail 511 by the first transfer stage 515, and the stack guide 30 evaded at the second transfer rail 513 may be configured to move toward the component stacking unit 350 along the first transfer rail 511 by the first transfer stage 515.

As described above, the component pressurizing unit 410 may be configured to separate the stack body 6, on which the separating plate component 4 and the MEA sheet component 5 are stacked, from the stack guide 30, and mount the insulating plate 8 and the fastening bar 9 to the stack body 6, and load the stack body 6 as the fuel cell stack 1 onto the stack discharging unit 550, which is to be described below.

Figure 24:
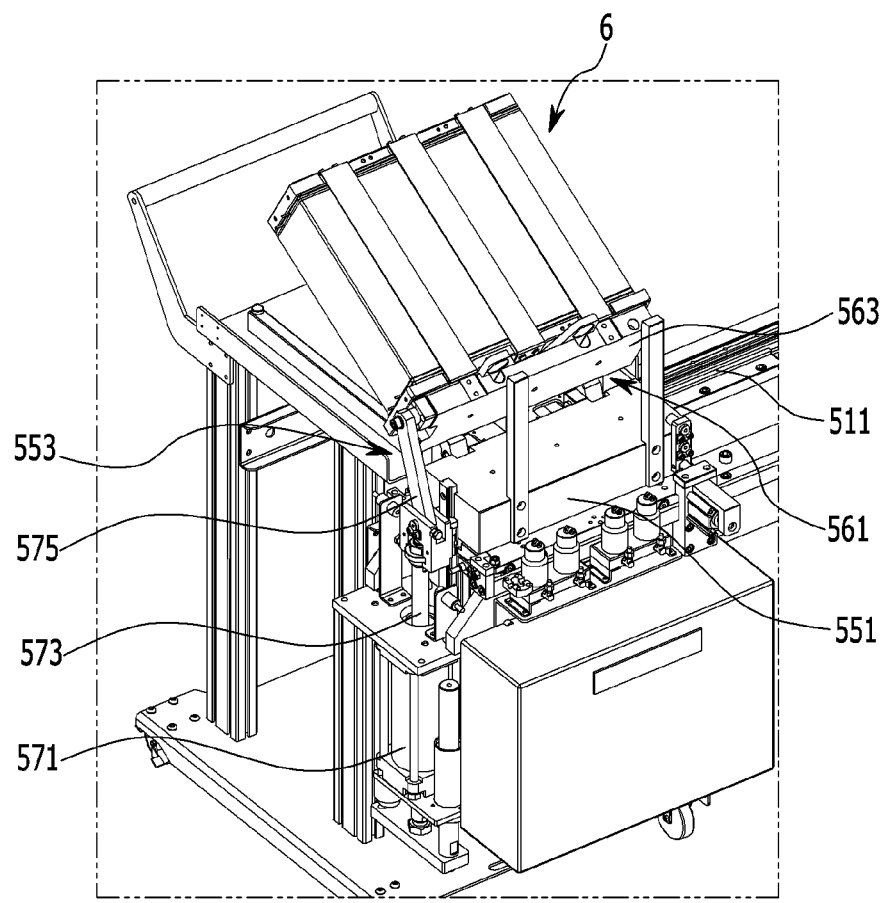
FIGS. 24 and 25 are diagrams illustrating a stack discharging unit applied to the apparatus for rapidly stacking a fuel cell stack according to the exemplary embodiment of the present invention.
Figure 25:
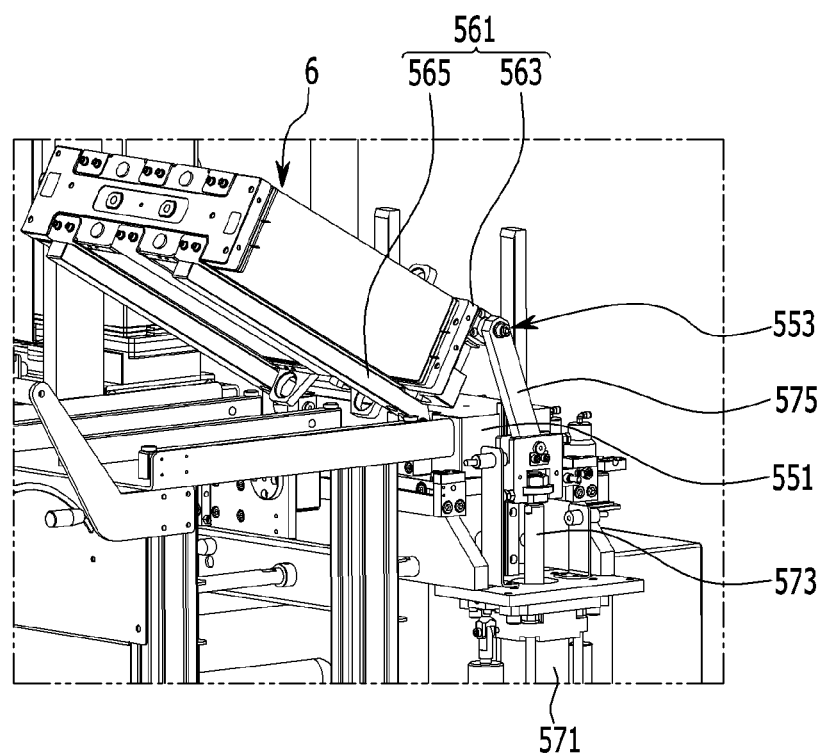

In the exemplary embodiment of the present invention, the stack discharging unit 550 may be configured to discharge the stack body 6 assembled as the fuel cell stack 1 from the component pressurizing unit 410 to the exterior of the transfer route of the stack guide 30 (e.g., remove the stack body 6 from the transfer route of stack guide 30). The stack discharging unit 550 may be movable from the component pressurizing unit 410 side to the completion end of the transfer route of the stack guide 30 and may include a second transfer stage 511 and a tilting discharging unit 553 as illustrated in FIGS. 24 and 25.

The second transfer stage 551 may be movable in a section from the component pressurizing unit 410 to the completion end of the first transfer rail 511 between the beginning end and the completion end of the first transfer rail 511. The second transfer stage 551 may be configured to support the stack body 6 unloaded by the component pressurizing unit 410, and move along the section from the component pressurizing unit 410 to the completion end of the first transfer rail 511. The second transfer stage 551 may be slidably coupled to the first transfer rail 511 by a separate driving device (not illustrated). Since the driving device may be formed of a rail slide moving device as is well known in the art, a more detailed description of a configuration thereof will be omitted in the present specification.

The tilting discharging unit 553 may be configured to discharge the stack body 6 as the fuel cell stack 1 to the exterior of the first transfer rail 511 while tilting the stack body 6, and may be installed in the second transfer stage 551. The tilting discharging unit 553 may include a tilt bracket 561 and a tilt operating cylinder 571. The tilt bracket 561 may be configured to support the stack body 6 and may be rotatably installed in the second transfer stage 551. The tilt bracket 561 may include a holding plate 563 that holds (e.g., grasps, supports, etc.) a lower side of the stack body 6, and a pair of supports 565 configured to support a lateral surface of a discharged stack body 6. The pair of supports 565 may be fixedly coupled to the holding plate 563, and rotatably hinge-coupled to the second transfer stage 551.

The tilt operating cylinder 571 may be fixedly installed in the second transfer stage 551 and may include an operating rod 573 configured to operate forward and backward in the vertical direction (e.g., up and down movements). The operating rod 573 may be connected to the holding plate 563 of the tilt bracket 561 by a connection rod 575. Opposite ends of the connection rod 575 may be hinge-coupled to a leading end of the operating rod 573 and the holding plate 563, respectively.

Moreover, an operation of the apparatus 100 for rapidly stacking a fuel cell stack according to the exemplary embodiment of the present invention as described above will now be described with reference to the previously disclosed drawings in detail.

First, in the exemplary embodiment of the present invention, the first magazine 111 in which the separating plate components 4 are accommodated, and the second magazine 112 in which the MEA sheet components 5 are accommodated, may be loaded onto the support frame 115 of the lift unit 110. In particular, the first magazine 111 and the second magazine 112 may be transferred to the lift unit 110 by a first trolley 801, and loaded onto the support frame 115. In addition to the pair of first and second magazines 111 and 112, another pair of first and second magazines 111 and 112 and yet another pair of first and second magazines 111 and 112 may be serially loaded onto the lift support frame 115. In other words, pairs of magazines may be continuously loaded onto the lift support frame.

In the exemplary embodiment of the present invention, one of the separating plate components 4 of the first magazine 111 and one of the MEA sheet components 5 of the second magazine 112 may be simultaneously picked up (e.g., collected, grasped, gripped, etc.) by the first and second component grippers 153 and 155 of the component pick-up unit 150, and the components 4 and 5 may be loaded onto the beginning end of the component transfer route 131 of the conveyor 130. Particularly, the first and second component grippers 153 and 155 may be configured to move linearly toward the first and second magazines 111 and 112 and move in the lower direction by the first driving device 190, and vacuum-adsorb the separating plate component 4 and the MEA sheet component 5 accommodated in the first and second magazines 111 and 112, respectively.

Then, the first and second component grippers 153 and 155 may be configured to move in the upper direction by the first driving device 190 while vacuum-adsorbing the separating plate component 4 and the MEA sheet component 5, respectively, and move linearly to the beginning end of the conveyor 130. When vacuum suction force is released while the first and second component grippers 153 and 155 move in the lower direction by the first driving device 190, the first and second component grippers 153 and 155 may be configured to load the separating plate component 4 and the MEA sheet component 5 onto the beginning end of the component transfer route 131 of the conveyor 130.

In the process of continuously loading the separating plate component 4 and the MEA sheet component 5 of the first and second magazines 111 and 112 onto the conveyor 130 using the component pick-up unit 150, in the exemplary embodiment of the present invention, the lift plate 113 within the first and second magazines 111 and 112 may be configured to move in the upper direction by the lift driving device 125 of the lift unit 110.

The separating plate component 4 and the MEA sheet component 5 accommodated in the first and second magazines 111 and 112, respectively, may be configured to move in the upper direction by the lift plate 113 while being unloaded by the first and second component grippers 153 and 155. Accordingly, the first and second component grippers 153 and 155 may be configured to move along a predetermined route by the first driving device 190, and grip the separating plate component 4 and the MEA sheet component 5 of the first and second magazines 111 and 112, and load the gripped separating plate component 4 and MEA sheet component 5 onto the conveyor 130.

When the separating plate component 4 within the first magazine 111 is vacuum-adsorbed by the first component gripper 153 as described above, the paper 169 interposed between the separating plate components 4 may be simultaneously vacuum-by through the paper gripper 161. In particular, the paper gripper 161 may be configured to vacuum-adsorb the paper 169 through the manifold apertures 4c of the separating plate component 4. Then, the separating plate component 4 may be vacuum-adsorbed by the first component gripper 153, while the paper 169 is simultaneously vacuum-adsorbed by the paper gripper 161, and the separating plate component 4 may be configured to move toward the beginning end of the component transfer route 131 of the conveyor 130.

In this process, when the vacuum suction force of the paper gripper 161 is released, and the paper 169 may be separated from the separating plate component 4 and the paper gripper 161 by the paper separating member 171. The paper separating member 171 may be configured to operate forward and backward through the manifold apertures 4c of the separating plate component 4, and separate the separating plate component 4 and the paper 169 from the paper gripper 161.

The paper 169 separated from the separating plate component 4 and the paper gripper 161 may fall as described above, and may be collected into the paper collecting container 175 between the first and second magazines 111 and 112 and the beginning end of the component transfer route 131 of the conveyor 130. In addition, the separating plate component 4 and the MEA sheet component 5 loaded onto the start end side of the component transfer route 131 of the conveyor 130 by the first and second component grippers 153 and 155 of the component pick-up unit 150 may be transferred along the component transfer route 131 by the conveyor 130.

In the exemplary embodiment of the present invention, in the process in which the separating plate component 4 and the MEA sheet component 5 are transferred along the component transfer route 131 by the conveyor 130, damage, a seating state, and the like of the separating plate component 4 and the MEA sheet component 5 may be detected by the component examining unit 210. Particularly, the component examining unit 210 may be configured to detect edge locations of the manifold apertures 4c of the separating plate component 4 and the MEA sheet component 5 using a pair of location sensors 211, and may be configured to output the detection signal to the controller 900. Then, in response to receiving the detection signal from the location sensors 11, the controller 900 may be configured to determine whether the separating plate component 4 and the MEA component 5 include defects based on the predetermined location information (e.g., edge location information of the manifold aperture) of the separating plate component 4 and the MEA sheet component 5.

Each location sensor 211 may be configured to move in a width direction of the conveyor 130 along the first location adjusting rail 213 and move in the vertical direction along the second location adjusting rail 217, to adjust the location of the location sensor 211 based on the manifold apertures 4c of the separating plate component 4 and the MEA sheet component 5. When the controller 900 determines that at least one of the separating plate component 4 and the MEA sheet component 5 includes a defect, the separating plate component 4 and the MEA sheet component 5, which are a unit set determined to have a defect, may be vacuum-adsorbed on the conveyor 130 by the defective component extracting grippers 251 of the defective component extracting unit 250 and loaded onto the tray 271 at the external side of the conveyor 130. The defective component extracting grippers 251 may then be configured to move in the lower direction by the second driving device 290 from the upper side of the conveyor 130 and vacuum-adsorb the separating plate component 4 and the MEA sheet component 5 that is the unit set determined to have the defect.

Further, the defective component extracting grippers 251 may be configured to move in the upper direction by the second driving device 290 while vacuum-adsorbing the separating plate component 4 and the MEA sheet component 5, respectively, and move linearly toward the tray 271 at the external side of the conveyor 130 along the direction crossing the component transfer route 131 of the conveyor 130. When the vacuum suction force is released, the defective component extracting grippers 251 may be configured to load the separating plate component 4 and the MEA sheet component 5 onto the tray 271 while moving in the lower direction by the second driving device 290.

After the aforementioned process, in the exemplary embodiment of the present invention, the separating plate component 4 or the MEA sheet component 5 transferred to the completion end of the component transfer route 131 of the conveyor 130 may be loaded onto the base plate 311 of the component aligning unit 310 by the stack gripper 351 of the component stacking unit 350. An operation of the stack gripper 351 will be described below in more detail. The base plate 311 of the component aligning unit 310 may then be configured to discharge compressed air through the air exhaust apertures 312, and raise the separating plate component 4 or the MEA sheet component 5 to a predetermined height.

In the exemplary embodiment of the present invention, when the separating plate component 4 or the MEA sheet component 5 is raised above the base plate 311, the touch members 321, 322, and 323 of the component aligning unit 310 may be configured to align the separating plate component 4 or the MEA sheet component 5 to predetermined locations while touching (e.g., contacting, abutting) edge portions of the separating plate component 4 or the MEA sheet component 5.

The first touch member 321 may touch a rear edge portion of the separating plate component 4 or the MEA sheet component 5 while fixed to a rear external side of the base plate 311. The second touch member 322 may be configured to reciprocate in the front and rear directions by the first touch cylinder 331. Then, the second touch member 322 may be configured to push the separating plate component 4 or the MEA sheet component 5 from the front side to the rear side of the base plate 311 while touching the front edge portion of the separating plate component 4 or the MEA sheet component 5. The third touch member 323 may be configured to reciprocate in a side direction by the second touch cylinder 332. The third touch member 323 may then be configured to push the separating plate component 4 or the MEA sheet component 5 in both side directions of the base plate 311 while touching both side edge portions of the separating plate component 4 or the MEA sheet component 5.

In the exemplary embodiment of the present invention, the separating plate component 4 and the MEA sheet component 5 may be stacked on the stack guide 30 by the stack gripper 351 of the component stacking unit 350 when the positions of the separating plate component 4 and the MEA sheet component 5 are aligned by the component aligning unit 310. The stack gripper 351 of the component stacking unit 350 may be configured to grip any one component of the separating plate component 4 and the MEA sheet component 5, aligned by the component aligning unit 310 as one pair (e.g., grip them together), and simultaneously grip the other one of the separating plate component 4 and the MEA sheet component 5 disposed at the completion end side of the conveyor 130. In other words, the stack gripper 351 may be configured to grip any one component, and stack the gripped component on the stack guide 30 to be transferable in the direction crossing the component transfer route 131 of the conveyor 130. Then, the stack gripper 351 may be configured to grip the other component and transfer the gripped component to the component aligning unit 310.

In particular, the pair of stack guides 30 may be configured to guide and stack the separating plate component 4 and the MEA sheet component 5 loaded by the stack grippers 351. Any one of the pair of stack guides 30 may be disposed at the beginning end of the first transfer rail 511 by the first transfer stage 515 of the transferring unit 510. The lower end plate 7 may be loaded onto the one stack guide 30 by the end plate loading unit 450. Accordingly, the pair of stack grippers 351 may be configured to move in the lower direction by the third driving device 390 from the upper side of the finish end of the component transfer route 131 of the conveyor 130 and the upper side of the component aligning unit 310. Then, the stack grippers 351 may be configured to vacuum-adsorb any one component of the separating plate component 4 and the MEA sheet component 5 disposed at the completion end side of the conveyor 130, and the other component disposed in the component aligning unit 310.

Subsequently, the stack grippers 351 may be configured to move in the upper direction by the third driving device 390 while vacuum-adsorbing the separating plate component 4 and the MEA sheet component 5, and move linearly toward any one of the aforementioned stack guides 30 in the same direction as that of the component transfer route 131 of the conveyor 130. When the vacuum suction force is released while the stack grippers 351 move in the lower direction by the third driving device 390, the stack grippers 351 may be configured to load any one component of the separating plate component 4 and the MEA sheet component 5 to the component aligning unit 310, and load the other component to any one of the stack guides 30.

In the exemplary embodiment of the present invention, in the process of stacking the separating plate component 4 and the MEA sheet component 5 on any one of the stack guides 30, the stack examining unit 370 may be configured to detect stack degrees of the separating plate component 4 and the MEA sheet component 5 stacked on the stack guide 30. The stack examining unit 370 may be configured to capture or detect (e.g., vision-photograph) both manifold apertures 4c of the separating plate component 4 and the MEA sheet component 5 stacked on the stack guide 30 using the vision sensor 371, and output vision data to the controller 900.

In response to receiving the vision data from the vision sensor 371, the controller 900 may be configured to determine whether a stack degree of the components is insufficient based on predetermined stack degrees of the separating plate component 4 and the MEA sheet component 5. When the controller 900 determines that the stack degree of the separating plate component 4 and the MEA sheet component 5 is insufficient, the stack grippers 351 of the component stacking unit 350 may be operated by the controller 900 to extract the separating plate component 4 and the MEA sheet component 5 from the stack guide 30 in which the stack degree is determined to be insufficient. The stack grippers 351 of the component stacking unit 350 may then be operated by the controller 900 to re-insert another separating plate component 4 and another MEA sheet component 5 to the stack guide 30.

In the process of stacking the separating plate component 4 and the MEA sheet component 5 in any one stack guide 30 as described above, the other stack guide 30 in the unloaded state may be transferred to the end plate loading unit 450 between the component stacking unit 350 and the component pressurizing unit 410 by the first transfer stage 515. In particular, the first transfer stage 515 may be transferred to the end plate loading unit 450 along the first transfer rail 511. Then, the end plate gripper 451 of the end plate loading unit 450 may be configured to grip the end plates 7 separately accommodated in the frame 10 one by one (e.g., individually), and load the lower end plate 7 onto the other stack guide 30.

In the exemplary embodiment of the present invention, after the lower end plate 7 is loaded onto the other stack guide 30 by the end plate gripper 451, dummy cells (not illustrated) separately accommodated in the frame 10 may be manually stacked on the lower end plate 7. The dummy cells may be provided as buffer cells, which do not serve as fuel cells at all, but serve to reinforce strength and durability of the entire fuel cell stack.

In the exemplary embodiment of the present invention, the other stack guide 30, onto which the lower end plate 7 is loaded, may then be transferred to the second transfer rail 513 in a direction crossing the first transfer rail 511 by the first transfer stage 515. In other words, in the exemplary embodiment of the present invention, the other stack guide 30 onto which the lower end plate 7 is loaded may be evaded to the evasion section of the second transfer rail 513 from the first transfer rail 511.

Further, when the separating plate component 4 and the MEA sheet component 5 are stacked on any one stack guide 30 by the stack grippers 351, the stack guide 30, on which the separating plate component 4 and the MEA sheet component 5 are stacked, may be transferred to the end plate loading unit 450 between the component stacking unit 350 and the component pressurizing unit 410 by the first transfer stage 515. In particular, the first transfer stage 515 may be transferred to the end plate loading unit 450 along the first transfer rail 511. Then, the end plate gripper 451 of the end plate loading unit 450 may be configured to grip the end plates 7 separately accommodated in the frame 10 one by one (e.g., individually), and load the upper end plate 7 onto the stack guide 30 on which the separating plate component 4 and the MEA sheet component 5 are stacked.

The aforementioned end plate gripper 451 may be configured to move in the lower direction by the fourth driving device 490 from the upper sides of the end plates 7 separately accommodated at the external side of the transfer route of the stack guide 30, and vacuum-adsorb the end plate 7. The end plate gripper 451 may then be configured to move in the upper direction by the fourth driving device 490 while vacuum-adsorbing the end plate 7, and move linearly in the direction crossing the transfer route of the stack guide 30. When vacuum suction force is released while the end plate gripper 451 move in the lower direction by the fourth driving device 490, the end plate gripper 451 may be configured to load the lower end plate 7 onto the stack guide 30 in the unloaded state or load the upper end plate 7 to the stack guide 30 on which the separating plate component 4 and the MEA sheet component 5 are stacked.

As described above, when the upper and lower end plates 7 are loaded onto the stack guide 30 by the end plate grippers 451 and thus the end plates 7 separately accommodated in the frame 10 are removed, the end plates 7 may be inserted into the frame 10 by a second trolley 802 in the exemplary embodiment of the present invention. Before the upper end plate 7 is loaded onto the stack guide 30 through the end plate gripper 451, the aforementioned dummy cells (not illustrated) may also be manually stacked on the stack guide 30.

Further, when the upper and lower end plates 7, the separating plate component 4, and the MEA sheet component 5 are stacked on the stack guide 30, the stack guide 30 may be transferred toward the component pressurizing unit 410 along the first transfer rail 511 by the first transfer stage 515. In this process, the stack guide 30 in the unloaded state, evaded to the evasion section of the second transfer rail 513 while being loaded with the lower end plate 7, may be transferred toward the component stacking unit 350 along the first transfer rail 511 by the first transfer stage 515.

In the exemplary embodiment of the present invention, when the stack guide 30, on which the upper and lower end plates 7, the separating plate component 4, and the MEA sheet component 5 are stacked, is transferred toward the component pressurizing unit 410, the upper and lower end plates 7, the separating plate component 4, and the MEA sheet component 5 within the stack guide 30 may be pressurized by the press member 411 of the component pressurizing unit 410. In particular, the press member 411 may be configured to move in the lower direction by the press cylinder 413, and pressurize the upper and lower end plates 7, the separating plate component 4, and the MEA sheet component 5 within the stack guide 30.

Subsequently, in the exemplary embodiment of the present invention, the stack body 6 as the fuel cell stack 1, in which the upper and lower end plates 7, the separating plate component 4, and the MEA sheet component 5 are pressurized by the press member 411 and stacked, may be fixed to the press member 411 by the pair of fixing rods 415, separately from the stack guide 30. The lower end of the fixing rod 415 may be coupled to the part that supports the lowermost part of the stack body 6 within the stack guide 30 when the upper end of the fixing rod 415 is fixed to the press member 411.

The press member 411 may be configured to move in the upper direction by the press cylinder 413 and the stack body 6 may be separated to the external side (upper side) of the stack guide 30. An accessory, such as the insulating plate 8 and the fastening bar 9, may be mounted in the stack body 6 while the stack body 6 rotates 360° together with the press member 411 by the press motor 417. Additionally, air-tightness (e.g., seal) of the stack body 6 lifted by the press member 411 may be detected by the air-tightness examining unit 430. In particular, air-tightness examining unit 430 may be configured to supply hydrogen gas, air, and a cooling medium to the separating plate component 4 and the MEA sheet component 5 of the stack body 6, measure pressure of the hydrogen gas, the air, and the cooling medium of the separating plate component 4 and the MEA sheet component 5, and detect air-tightness of the stack body 6.

In the process, the stack guide 30 in the unloaded state, from which the stack body 6 is separated, may be transferred toward the end plate loading unit 450 between the component stacking unit 350 and the component pressurizing unit 410 along the first transfer rail 511 by the first transfer stage 515. Then, the end plate gripper 451 of the end plate loading unit 450 may be configured to grip the end plates 7 separately accommodated in the frame 10 one by one (e.g., individually), and load the lower end plate 7 onto the stack guide 30 in the unloaded state.

In the exemplary embodiment of the present invention, the stack guide 30, onto which the lower end plate 7 is loaded, may then be transferred to the second transfer rail 513 of the evasion section of the first transfer rail 511. Simultaneously, the second transfer stage 551 of the stack discharging unit 550 may be transferred to a lower side of the stack body 6 along the first transfer rail 511. Then, the press member 411 lifting the stack body 6 may be configured to move in the lower direction by the press cylinder 413, and load the press member 411 onto the second transfer stage 551 of the stack discharging unit 550.

The lower end of the fixing rod 415 may be separated from the part that supports the lowermost part of the stack body 6 when the stack body 6 is laid (e.g., placed, arranged, etc.) on the second transfer stage 551 of the stack discharging unit 550 by the press member 411, and the press member 411 may again be configured to move in the upper direction by the press cylinder 413. In particular, the stack body 6 may be supported by the tilt bracket 561 of the tilting discharging unit 553 on the second transfer stage 551. In other words, the tilt bracket 561 may support the lower side of the stack body 6 using the holding plate 563, and the lateral side of the stack body 6 using the support 565. Then, the second transfer stage 551 may be transferred to the completion end of the first transfer rail 511 from the press member 411 side of the component pressurizing unit 410.

Next, in the exemplary embodiment of the present invention, the operating rod 573 of the tilt operating cylinder 571 may be driven forward, and the tilt bracket 561 may be tilt-rotated toward the external side of the first transfer rail 511. The operating rod 573 of the tilt operating cylinder 571 and the holding plate 563 of the tilt bracket 561 may be hinge-coupled to each other by the connection rod 575, to allow the tilt bracket 561 to be tilt-rotated to the external side of the first transfer rail 511 by the forward operation of the operating rod 573 while supporting the stack body 6. The tilt bracket 561 that supports the stack body 6 may then be tilt-rotated toward the external side of the first transfer rail 511 to load the stack body 6 onto a third trolley 803.

Accordingly, the apparatus 100 for rapidly stacking a fuel cell stack according to the exemplary embodiment of the present invention may continuously assemble the fuel cell stack 1 through the series of aforementioned automation process. As described above, the apparatus 100 for rapidly stacking a fuel cell stack according to the exemplary embodiment of the present invention may automatically stack and pressurize the fuel cell components 3 and assemble the fuel cell stack 1. Accordingly, it may be possible to improve productivity by decreasing an operation time for assembling the fuel cell stack 1, guarantee a stack degree of the fuel cell components 3, and improve quality of the fuel cell stack 1.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An apparatus for rapidly stacking a fuel cell stack, which assembles a fuel cell stack by stacking and pressurizing a separating plate component, in which a negative electrode metal separating plate and a positive electrode metal separating plate are bonded to each other, and a membrane-electrode assembly sheet component, in which gas diffusion layers are bonded to both surfaces of the membrane-electrode assembly sheet component, respectively, the apparatus comprising:
    a component aligning unit connected to a completion end of a component transfer route of a conveyor to align the separating plate component and the membrane-electrode assembly sheet component transferred by the conveyor to predetermined positions;
    a component stacking unit installed at a side of the component aligning unit, and configured to grip the separating plate component and the membrane-electrode assembly sheet component and stack the separating plate component and the membrane-electrode assembly sheet component on a stack guide; and
    a component pressurizing unit installed at an upper side of a transfer route, through which the stack guide is transferred, and configured to pressurize the separating plate component and the membrane-electrode assembly sheet component stacked on the stack guide,
    wherein the component stacking unit includes:
        a pair of stack grippers disposed at an upper side of a beginning end of the transfer route of the stack guide, installed to reciprocate in a transfer direction of the separating plate component and the membrane-electrode assembly sheet component, installed to reciprocate in a vertical direction, and configured to vacuum-adsorb the separating plate component and the membrane-electrode assembly sheet component.

2. The apparatus of claim 1, wherein the pair of stack grippers are configured to vacuum-adsorb one component between the separating plate component and the membrane-electrode assembly sheet component disposed at a completion end side of the conveyor and load the component vacuum-adsorbed onto the component aligning unit, and vacuum-adsorb another component between the separating plate component and the membrane-electrode assembly sheet component disposed in the component aligning unit and load the component vacuum-adsorbed onto the stack guide.

3. The apparatus of claim 1, wherein the component aligning unit includes:
    a base plate configured to support the separating plate component and the membrane-electrode assembly sheet component; and
    a plurality of touch members installed on the base plate, and configured to touch edge portions of the separating plate component and the membrane-electrode assembly sheet component.

4. The apparatus of claim 3, wherein the base plate includes a plurality of air exhaust apertures through which air is discharged to raise the separating plate component and the membrane-electrode assembly sheet component with pressure of the air.

5. The apparatus of claim 3, wherein the touch members include:
    a pair of first touch members fixedly installed at a rear external side of the base plate, fitted to a rear edge portion of the base plate, and configured to touch rear edge portions of the separating plate component and the membrane-electrode assembly sheet component;
    a pair of second touch members installed to be movable in front and rear directions at a front external side of the base plate, fitted to a front edge portion of the base plate, and configured to touch front edge portions of the separating plate component and the membrane-electrode assembly sheet component; and
    a pair of third touch members passing through both sides of the base plate, installed to be movable in a direction of the side, and configured to touch both side edge portions of the separating plate component and the membrane-electrode assembly sheet component.

6. The apparatus of claim 5, wherein the second touch members are installed to reciprocate in the front and rear directions by a first touch cylinder fixedly mounted to a lower surface of the base plate, and the third touch members are installed to reciprocate in a side direction by a second touch cylinder fixedly mounted to the lower surface of the base plate.

7. The apparatus of claim 1, wherein the component pressurizing unit includes a press member installed to reciprocate in the vertical direction by a press cylinder, and configured to rotate by a motor.

8. The apparatus of claim 7, wherein a pair of fixing rods for fixing a stack body, in which the separating plate component and the membrane-electrode assembly sheet component are stacked separately from the stack guide, are installed in the press member.

9. The apparatus of claim 1, further comprising:
    an air-tightness examining unit connected to the component pressurizing unit and configured to supply a fluid to a stack body, in which the separating plate component and the membrane-electrode assembly sheet component are stacked by the component pressurizing unit, and detect air-tightness of the stack body.

10. The apparatus of claim 9, further comprising:
    a stack examining unit installed at the side of the component stacking unit, and configured to monitor the separating plate component and the membrane-electrode assembly sheet component stacked on the stack guide.

* * * * *